United States Patent [19]

Nakamura et al.

[11] Patent Number: 5,206,575
[45] Date of Patent: Apr. 27, 1993

[54] DEVICE FOR CONTROLLING AN AC MOTOR

[75] Inventors: Yoshinobu Nakamura, Aichi; Hiroshi Mochikawa, Mie, both of Japan

[73] Assignee: Kabushiki Kaisha Toshiba, Kanagawa, Japan

[21] Appl. No.: 610,248

[22] Filed: Nov. 9, 1990

[30] Foreign Application Priority Data

Nov. 10, 1989 [JP] Japan .................. 1-292839

[51] Int. Cl.⁵ .............................. H02P 5/28
[52] U.S. Cl. .................... 318/807; 318/829
[58] Field of Search ................. 318/729, 807

[56] References Cited

U.S. PATENT DOCUMENTS

| | | | |
|---|---|---|---|
| 3,723,840 | 3/1973 | Opal et al. | 318/432 |
| 3,819,992 | 6/1974 | Opal et al. | |
| 4,291,264 | 9/1981 | Siemon | 318/729 |
| 4,420,718 | 12/1983 | Sakai et al. | 318/729 |
| 4,546,301 | 10/1985 | Tinebor et al. | 318/729 |
| 4,581,568 | 4/1986 | Fitzpatrick et al. | 318/729 |
| 4,590,413 | 5/1986 | Gritter et al. | 318/803 |
| 5,010,287 | 4/1991 | Mukai et al. | 318/729 |

Primary Examiner—William M. Shoop, Jr.
Attorney, Agent, or Firm—Finnegan, Henderson, Farabow, Garrett and Dunner

[57] ABSTRACT

In the A.C. electric motor control device of this invention, with the object of improving response to abrupt speed adjustments and load fluctuations, and of improving stability of control under low speed operation, a prescribed current of the inverter circuit is detected and the power factor or power is controlled in accordance with the amount of change in this current.

Specifically, a prescribed current of the inverter circuit is detected and the power factor or power is calculated from this detected current value. Using the result of this calculation, together with a command value, control quantities are calculated that determine the output voltage and output frequency of said inverter circuit. Control signals for the switching elements of said inverter circuit are then generated in accordance with these calculated control quantities.

6 Claims, 18 Drawing Sheets

DEVICE FOR CONTROLLING AN AC MOTOR

BACKGROUND OF THE INVENTION

This invention relates to a control device for an AC motor using an inverter circuit.

Control devices for AC motors may be of many different types, depending on the type of the AC motor to be controlled.

This invention is concerned with a device for controlling induction motors and brushless motors equipped with a rotor of the permanent magnet type.

First, a device for controlling a brushless motor will be described.

To control brushless motors, instead of employing a position detection element such as a Hall element to detect the relative position of the stator winding and permanent magnet type rotor, a system has come to be employed wherein this position is detected by using the terminal voltages, which contain the induced voltages generated in the stator winding.

A prior art example of this is shown in FIG. 22. The numeral 1 denotes a DC current source. The numeral 2 denotes an inverter circuit for passing current to stator windings 3U, 3V and 3W of brushless motor 3. Numerals 4, 5 and 6 denote filter circuits that shift by 90 degrees the phase of terminal voltages UV, VV, and WV containing the induced voltages generated in stator windings 3U, 3V and 3W. Numeral 7 denotes a detection circuit whereby the neutral point voltage NV is obtained from the output signals of these filter circuits 4 to 6. Numerals 8, 9 and 10 are comparators that respectively compare the output signals of filter circuits 4 to 6, which constitute first order delay elements, and neutral point voltage NV. Numeral 11 denotes a control circuit.

FIG. 23 is a timing chart showing the operation of the prior art example. We shall now consider the U phase with reference to this timing chart. During commutation of the inverter circuit 2 the terminal voltage UV (see FIG. 23(a)) generated in stator winding 3U contains a voltage spike that is produced by conduction of the opposite arm return flow diode. In order to eliminate the effect of this voltage spike component, the terminal voltage UV is shifted in phase by 90 degrees by means of filter circuit 4, producing the phase-shifted voltage DUV as shown in FIG. 23(b). After this, this phase-shifted voltage DUV and the neutral point voltage NV shown in FIG. 23(b) are compared by comparator 8, to obtain a phase detection signal PSU as shown in FIG. (23c). The situation is the same for the other phases V and W, position detection signals PSV and PSW being obtained as shown in FIG. 23(d) and (e) from comparators 9 and 10, based on terminal voltages VV and WV. These position detection signals PSU, PSV and PSW are signals that are 120 degrees different in phase for 180 degrees conduction. By applying these to control circuit 11, this control circuit 11 is made to output six commutation signals, which are applied to the bases of the transistors that constitute the switching elements of inverter circuit 2.

However, in the device described above for controlling a brushless motor, since filter circuits 4 to 6 having a 90 degrees lagging phase characteristic are provided in order to remove the voltage spike component contained in terminal voltages UV, VV and VW, the time constants of filter circuits 4 to 6 are large. This gives rise to the problem that it is not possible to track rapid acceleration or deceleration. A further problem in that phase detection is the low speed region is difficult. Furthermore, the size of the voltage spike component contained in terminal voltages UV, VV and WV varies depending on the magnitude of the current, i.e., the load of stator windings 3U, 3V and 3W, so if the load fluctuation is large, a phase error is produced in the signal waveform of filter circuits 4 to 6 et seq, causing a stability problem.

Next, a device for controlling a three-phase induction motor will be described.

This type of conventional device is disclosed Japanese Laid Open Patent Publication No. 62-100192, and is illustrated in FIG. 24.

A voltage type PWM inverter 12 consists of a rectifier circuit 14 that rectifies the three-phase AC voltage of three-phase AC power source 13, a smoothing capacitor 15 that smooths this rectified voltage, and a main inverter circuit 16 to which this smoothed DC voltage is applied. The AC output voltage from main inverter circuit 16 is then applied to three-phase induction motor 17. The current Idc flowing in the DC bus of inverter 12 is detected by current detector 18 and supplied as detection current I to low pass filter (LPF) 19. LPF 19 extracts the fundamental wave of the detected current I and outputs it as frequency correction value $\Delta f$. Subtractor 20 subtracts this frequency correction value $\Delta f$ from the frequency command value f* to give a reference frequency value f ($=$f*$-\Delta f$), which is output and applied to a pulse width modulation (PWM) control circuit 21. This pulse width modulation control circuit 21 is supplied with a voltage command value V* obtained by converting the frequency command value f* by means of a frequency-voltage (f$-$V) conversion circuit 22. As a result, pulse width modulation control circuit 21 performs pulse width modulation control by applying a base signal to the power transistors of main inverter circuit 16, based on reference frequency value f and voltage command value V*.

Thus, since, in a voltage type PWM inverter, the DC voltage is fixed, the mean value of the current flowing in the DC bus of inverter 12 is proportional to the power supplied to three-phase induction motor 17. In this case, assuming that the rotational speed of three phase induction motor 17 is sufficiently high, and that the rate of change of the speed of rotation is very small, torque fluctuation is proportional to power fluctuation controlling the mean current of the DC bus of inverter 12, torque control of three-phase induction motor 17 can be performed, and production of vibration can be prevented.

However, although the above control device is effective when the speed of revolution of the three phase induction motor 17 is sufficiently high, and the ratio of variation of speed of revolution is very small, during low speed operation, when the speed of revolution is low, the amount of power change for a given change of torque falls off. Even if this is therefore compensated by dividing by the speed of revolution or by the inferred value of the speed of revolution so as to remove dependence on the speed of operation, the lowered S/N ratio means that sufficient accuracy is not obtained. Stable driving of the inverter during low speed operation is therefore difficult.

SUMMARY OF THE INVENTION

This invention was made after consideration of the above circumstances. Its first object is to provide a control device for an AC motor providing good response characteristics and improved stability during sudden accelerations or decelerations and load fluctuations, by controlling the AC motor in accordance with the amount of change of current. Its second object is to provide a control device for an AC motor whereby the AC motor can be driven in a stable manner even during low speed operation.

A specific construction in order to achieve these objects is equipped with: current detection means that detects a prescribed amount of change of current of the inverter circuit; first calculating means that calculates the power factor or power from the detection signal of this current detection means; a second calculation means that calculates the control amount of the AC motor from the output signal of this first calculation means; and an inverter control means that controls the inverter circuit on the basis of this second calculation means.

With a control device for an AC motor of this invention constructed as above, the current on the DC side or AC side of the inverter circuit is detected; the power or power factor is calculated from this detected current value; the control amount of the AC motor is calculated from this calculated value; and said inverter circuit is controlled on the basis of this control value.

DETAILED DESCRIPTION OF PREFERRED EMBODIMENTS

Figure 1:
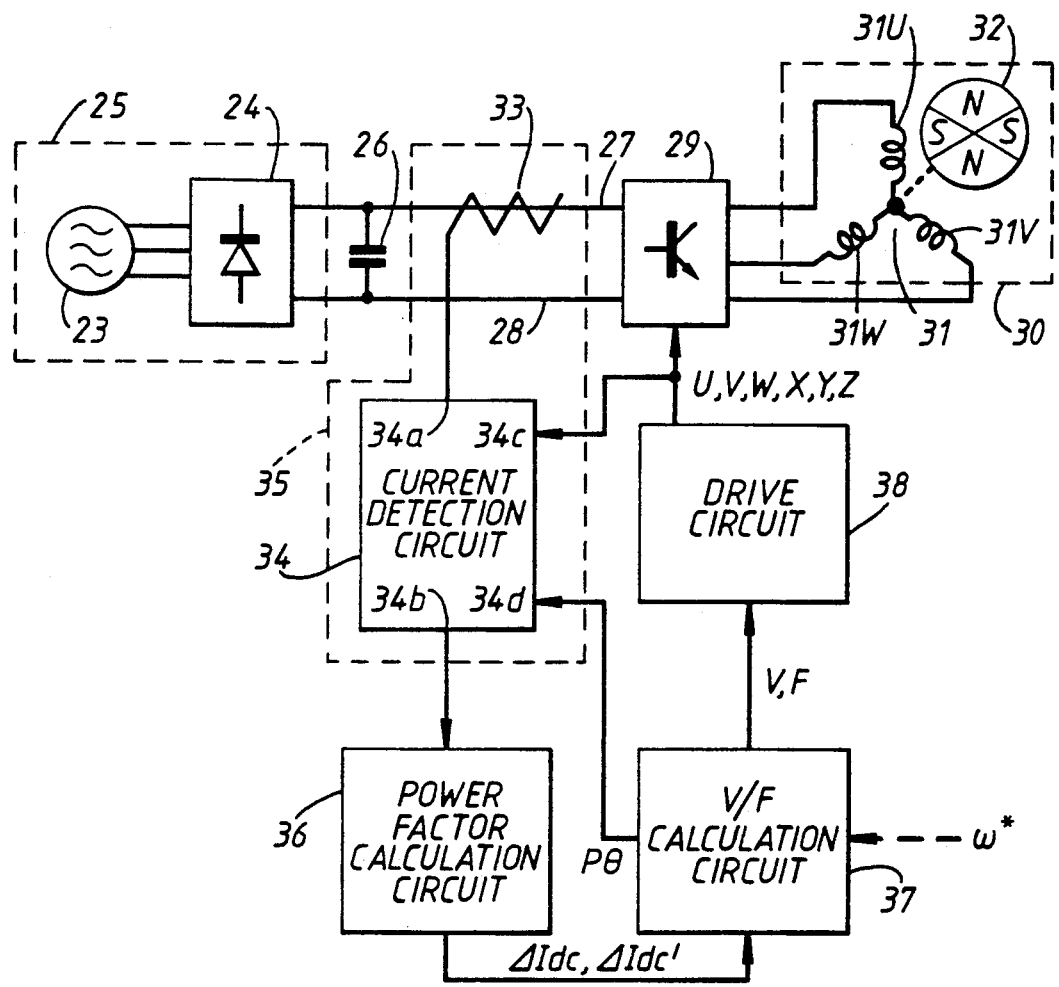
FIG. 1 is a block diagram showing an overall electrical layout of a first embodiment of the present invention.

The invention is described in detail below with reference to preferred embodiments of the inventor.

First, a first embodiment of this invention applied to a control device for a permanent magnet type brushless motor will be described with reference to FIGS. 1 through 5.

The overall layout will be described with reference to FIG. 1. A three-phase AC power source 23 is provided whose three-phase AC voltage is supplied to the AC input terminal of a full wave rectifier circuit 24 consisting of six diodes in a three-phase bridge connection. The DC output voltage of this full wave rectifier circuit 24 is applied to DC buses 27 and 28 through a smoothing capacitor 26 constituting therewith a DC power source 25. Numeral 29 denotes an inverter circuit consisting of six switching elements constituted by transistors connected in three-phase bridge fashion, its input terminal being supplied with the DC voltage between DC buses 27 and 28. A three-phase four-pole brushless motor 30 is provided which is equipped with a permanent magnet type rotor 32 and a stator 31 provided with U, V and W-phase stator windings 31U, 31V and 31W. Stator windings 31U, 31V and 31W are star-connected, and are supplied with the AC output voltages from the output terminals of inverter circuit 20. A current detector 33 includes a Hall CT, which is provided in a DC part of inverter circuit 29 constituted by DC bus 27. A current detection circuit 34, together with current detector 33, forms a current detection means 35. The DC current signal Idc that is detected by current detector 33 is supplied to the input terminal 34a of current detection circuit 34. The output I of this current detection circuit 34 is fed to power factor calculation circuit 36. As will be described, this power factor calculation circuit 36 is such that, based on the DC current signal Idc, a power factor signal ΔIdc and current change amount ΔIdc' are output as signals from its output terminals and applied to the input terminals of V/F calculation circuit 37 constituting voltage frequency (V/F) calculation means. As will be described, V/F calculation circuit 37 calculates a voltage signal V, frequency signal F and pulse signal Pθ from the power facto r signal ΔIdc, current change amount ΔIdc' and a speed command value $\omega^*$ that is supplied from a setting device, not shown. Voltage signal V and frequency signal F are output from its output terminals and supplied to the input terminals of drive circuit 38. Pulse signal Pθ is supplied to input terminal 34d of current detection circuit 34. Drive circuit 38 outputs six drive signals, U, V, W, X, Y, and Z which are PWM-controlled in accordance with the voltage signal V and frequency signal F, from its output terminals, and supplies these to the bases of the six transistors of inverter circuit 29. Rotor 32 of brushless motor 30 is thereby made to rotate at the rotational speed designated by speed command value $\omega^*$. Also, these drive signals, U, V, W, X, Y and Z are supplied to the input terminal 34c of current detection circuit 34.

An example layout of V/F calculation circuit 37 will now be described with reference to FIG. 2. The speed command value $\omega^*$ is supplied to each of the input terminals of integrating element 40 and V/F control element 41 through acceleration/deceleration time element 39. Integrating element 40 outputs frequency command signal $F^*$ from its output terminal and supplies it to the positive (+) input terminal of subtractor 42. V/F control element 41 outputs a voltage command signal $V^*$ from its output terminal and supplies it to one of the positive (+) input terminals of adder 43. Power factor signal $\Delta Idc$ is supplied to one of the input terminals of power calculation element 44, and the other input terminal of power calculation element 44 is supplied with voltage command signal $V^*$ through voltage calculation element 45, so that power calculation element 44 calculates the power value W and outputs it from its output terminal. This calculated power value W is supplied to the other positive (+) input terminal of adder 43 through first control element 46, and through second control element 47 is supplied to one positive (+) input terminal of adder 48. Current change amount $\Delta Idc'$ is supplied to the other positive (+) input terminal of adder 48 through a third control element 49. The result of the addition performed by this adder 48 is output from its output terminal and supplied to the negative (−) input terminal of a subtractor 42.

Figure 3:
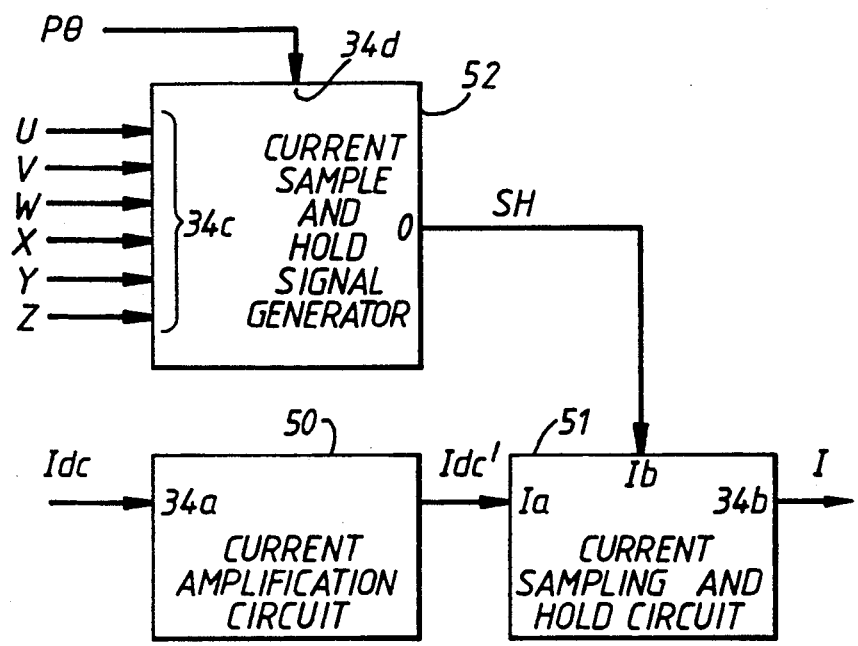
FIG. 3 is a block diagram showing an example layout of a current detection circuit of the first embodiment of the present invention.

An example layout of current detection circuit 34 will now be described with reference to FIG. 3. A current amplification circuit 50 forms, together with current detector 33, a current detection means. Its input terminal 34a is supplied with the above mentioned DC current signal Idc, with the result that amplified DC current signal Idc' is output from its output terminal and supplied to input terminal Ia of a current sampling and hold means including a current sampling and hold circuit 51. A current sampling and hold signal generating means 52 includes a current sampling and hold signal generating circuit, whose input terminals 34c are supplied with drive signals U, V, W, X, Y, and Z, whose input terminal 34d is supplied with a pulse signal P$\theta$, and whose output terminal O outputs a sampling and hold signal SH, which is supplied to input terminal Ib of current sampling and hold circuit 51. As will be described, by its sampling and hold action, current sampling and hold circuit 51 output detection current signals I for each phase from its output terminal 34b.

The operation of this embodiment will now be described with reference to FIG. 4 and FIG. 5.

Figure 4:
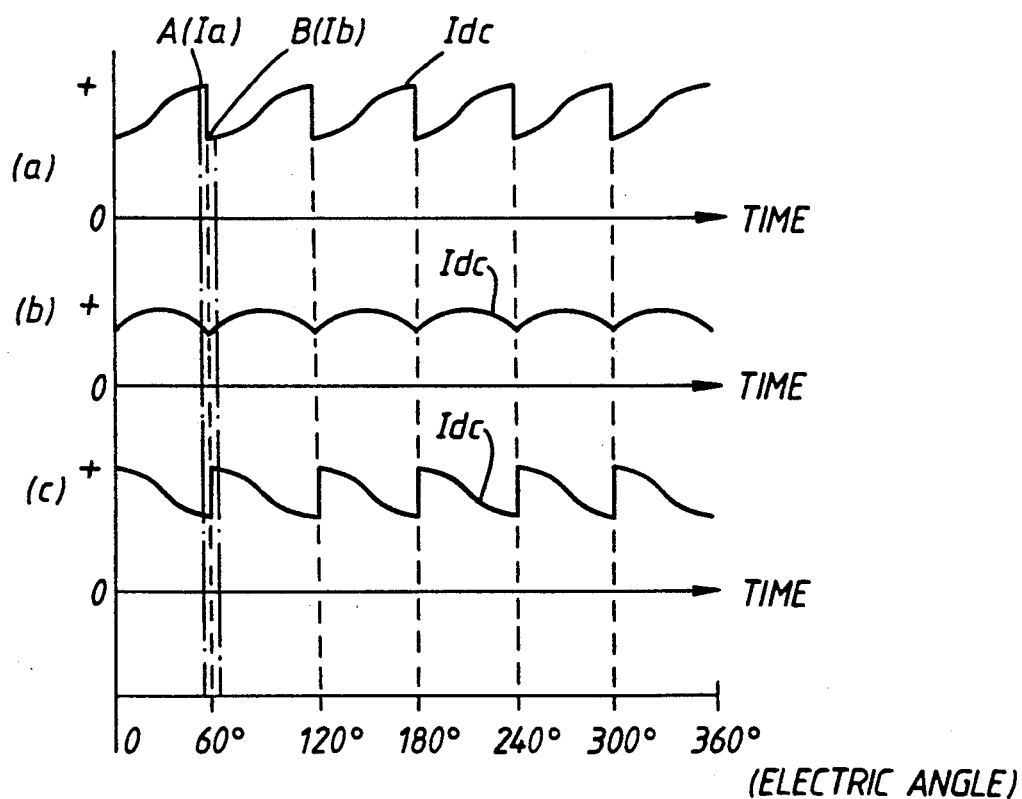
FIG. 4 is a waveform diagram of a DC current signal under conditions of different power factors of the first embodiment of the present invention.

FIG. 4 shows an effect of change of power factor on the waveform of DC signal Idc of current detection means 35, in the case where power factor control by inverter circuit 29 is not carried out. Specifically, when the power factor lags, as shown in FIG. 4(a), the waveform changes with a period of 1/6 (60 degrees in terms of electric angle) of the output frequency, and its change shows a rise on the right. In contrast, when the power factor is leading, as shown in FIG. 4(c), the waveform changes with the same period, but its change shows a fall on the right. When the power factor is approximately 1, as shown in FIG. 4(b), a waveform is obtained showing practically no change. The waveform of DC signal Idc therefore varies in a manner which is repeated at electric angle intervals of 60 degrees. Considering time points (0 degrees, 60 degrees, 120 degrees, 180 degrees, . . . 360 degrees) at 60 degree intervals of electric angle, a brushless motor 30 can be operated as shown in FIG. 4(b) such that the power factor is approximately uniform, by detecting the difference (Ib−Ia) of the current Ia at a point A immediately in front of each one of these time points, and the current Ib at a point B immediately after each one of these time points, and effecting control such that this difference is zero, i.e., such that currents Ia and Ib are equal. That is, the same operation can be performed as in the conventional brushless motor system in which the positions of the magnetic poles are detected from the terminal voltages of the stator windings.

Figure 5:
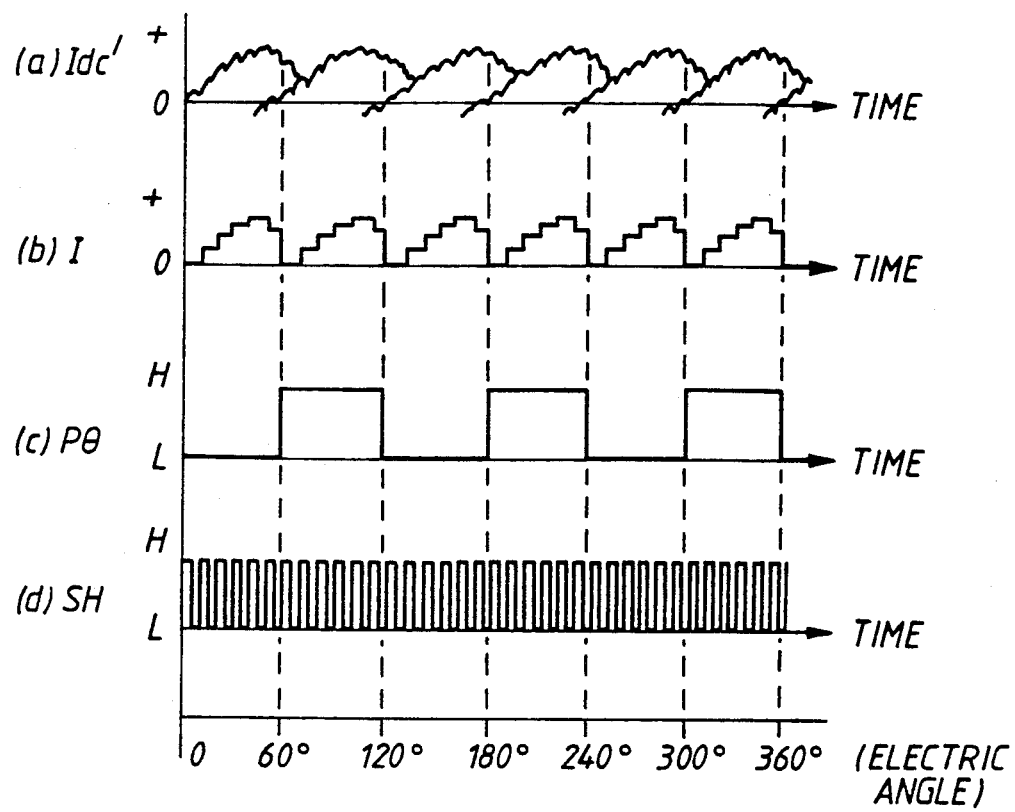
FIG. 5 is a signal waveform diagram showing the action of a current detection circuit of the first embodiment of the present invention.

Example waveforms at each part are shown in FIG. 5. FIG. 5(a) shows the DC current signal Idc' through the DC amplification circuit 50 corresponding to FIG. 4(a). The waveform is extremely complex, owing to the fact that PWM control is effected by means of inverter circuit 29. It is therefore not easy to detect the change in DC current signal Idc with a period of 1/6 of the output frequency as shown in FIG. 4 from the DC current signal Idc' as shown in FIG. 5(a).

Accordingly, the following process is performed. Drive circuit 38 supplies PWM-controlled drive signals U, V, W, X, Y, and Z, and V/F calculation circuit 37 supplies a pulse signal P$\theta$ (see FIG. 5(c)) that is inverted between low level and high level with a period of 1/6 of the output frequency of inverter circuit 29 to current detection circuit 34, respectively. In this current detection circuit 34, DC amplification circuit 50 is supplied with the DC current signal Idc from current detector 31, which it amplifies and outputs as DC current signal Idc'. Current sampling and hold signal generating circuit 52 inputs drive signals U, V, W, X, Y, and Z and pulse signal P$\theta$ and outputs sampling and hold signal SH as shown in FIG. 5(d). In response to the input of DC current signal Idc' and sampling and hold signal SH, current sampling and hold circuit 51 samples and holds the values of DC current signal Idc' every time the sampling and hold signal SH becomes high level. In this case, sampling and hold signal SH is output such that, for example, the first high level period (electric angle 0 degrees to 60 degrees) of pulse signal P$\theta$ is synchronized with the drive signal for the U phase, and the next low level period (electric angle 120 degrees to 180 degrees) is synchronized with the drive signal for the W phase, this process being carried out repetitively. Thus the detection current signal I of current sampling and hold circuit 51 is current signal IU, IV and IW for the U, V and W phases, respectively. This detection current signal I is applied to power factor calculation circuit 36.

Thus, power factor calculation circuit 36 detects the detection current signal I that is applied from current detection means 35 with a fixed sampling period, and calculates a power factor signal $\Delta Idc$ as the value (Ib−Ia) arrived at by subtracting current Ia from current Ib immediately after each electric angle of 60 degrees, and also calculates the current change $\Delta Idc'$ during this electric angle of 60 degrees. Thus the power factor signal $\Delta Idc$ indicates the power factor by positive (+) or negative (−) current values, instead of indicating the power factor itself.

On the other hand, in V/F calculating circuit 37, when speed command value ω* is applied to acceleration/deceleration time element 39, the output of acceleration/deceleration time element 39 rises with an arbitrary acceleration/deceleration time specified by speed command value ω*. This output is integrated by integrating element 40 and output as frequency command signal F*. The output is then compared with an arbitrary V/F pattern by V/F control element 41 to obtain a voltage command signal V* as output. Voltage command signal V* is multiplied by a suitable coefficient by voltage calculator element 45 and supplied to power calculation element 44 as a voltage value. Power calculation element 44 multiplies the voltage value from voltage calculating element 45 with power factor signal ΔIdc and coefficient K and outputs the result as power value W. Power value W is therefore given by:

$$W = V^* \times \Delta Idc \times K \quad (1)$$

First control element 46, that is supplied with this power W, finds the voltage component value Vdc of power value W by calculation, and carries out proportional integration processing:

$$W \times Kp \text{ (where Kp is a constant)} \quad (2)$$

$$(Vdc)N = (Vdc)N - 1 + W \times K1 \quad (3)$$

(where K1 is a coefficient and N>1 and is an integer).

From expression (1) and expression (2), proportional integral control:

$$(Vdc)N + W \times Kp \quad (4)$$

is performed. This is supplied to adder 43. Adder 43 calculates a voltage signal V as:

$$V = V^* + (Vdc)N + W \times Kp \quad (5)$$

by converting the above expression (4) and the voltage command signal V*. Expression (4) above is what is known as the proportional integration (PI) control expression. As is clear from equation (5), when the power value W is positive, i.e., when the power factor signal ΔIdc is positive, the current value Ib at point B in FIG. 4 is larger than the current value Ia at point A, so the power factor is a leading power factor, causing voltage signal V to rise. In contrast, when the power value W is negative, i.e., when the power factor signal ΔIdc is negative, the current value Ib at point B in FIG. 4 is smaller than the current value Ia at point A so the power factor is a lagging power factor, causing voltage signal V to drop. It should be noted that, although in this voltage control PI control was performed as shown by expression (4), depending on the application, proportional integral differential (PID) control could be performed. Also, second control element 47 is supplied with power value W, and performs a multiplication:

$$W \times K1 \text{ (where K1 is a coefficient)} \quad (6)$$

This second control element is controlled every electric angle of 60 degrees. Furthermore, a third control element 49 is supplied with current change value ΔIdc', and performs the multiplication:

$$\Delta Idc' \times K2 \text{ (where K2 is a coefficient)} \quad (7)$$

This third control element 49 is controlled in continuous fashion. After this, the outputs of these control elements 47 and 49 indicated by expressions (6) and (7) are added by adder 48 and then supplied to subtractor 42. Subtractor 42 performs a subtraction:

$$F = F^* - (W \times K1 + \Delta Idc' \times K2) \quad (8)$$

as a result of which a frequency signal F is output. This is when power value W or current change amount ΔIdc' increases, frequency signal F becomes small, causing the output frequency of inverter circuit 29 to fall. In contrast, when power value W or current change amount ΔIdc' decreases, frequency signal F gets larger, causing the output frequency of inverter circuit 29 to rise. Thus phase control is effected in response to increase or decrease of current, i.e., in response to load fluctuation, and stable control can be performed even for abrupt load fluctuations. Thus, V/F calculation circuit 37 calculates the amount of increase or amount of decrease determined by the feedback amount in response to change of the voltage command signal V* determined by speed command value ω* and the frequency command signal F* and DC current signal Idc. As a result, it delivers a voltage signal V and frequency signal F as output. Operation of brushless motor 30 is thereby controlled through drive circuit 38 and inverter circuit 29, such that the power factor is approximately 1.

The following benefits can be obtained with the embodiment described above.

Specifically, the current flowing in the DC side of inverter circuit 29 including DC bus 27 is detected by current detection means 35. Power factor calculation circuit 36 then calculates power factor signal ΔIdc and current change amount ΔIdc' from the change in this detected detection current signal I, and V/F calculating circuit 37 calculates a voltage signal V and frequency signal F using the result of this calculation and the speed command value ω*. Thus the operation of brushless motor 30 is controlled using this voltage signal V and frequency signal F through drive circuit 38 and inverter circuit 29 such that the power factor is approximately 1. The advantages of this are that, in contrast to the prior art in which the terminal voltages of the stator windings were employed for this purpose, there is no need to use a first order delay element constituted by a filter circuit. The result of this is that good response to abrupt acceleration or deceleration and load fluctuations can be obtained.

Accordingly, stability can be improved and there is an excellent response to external disturbance. Thus detection can be performed even in the low speed region and an increased range of control obtained. Furthermore, detected current signal I from current sampling and hold circuit 51 is output by sampling and holding the DC current signal Vdc' of the current detection means 35 that detects the current of the DC side (i.e., DC bus 28) of inverter circuit 29. The sampling and hold signal SH that is used for this purpose is obtained from a pulse signal, inverted with a period of 1/6 (electric angle 60 degrees) of the output frequency and from drive signals U, V, W, X, Y, and Z. The power factor can therefore be detected from the change of the waveform of this detected current signal I. It is therefore possible to control current feedback of brushless motor 30, and only a single current detection means 35 need be provided for this purpose. This facilitates signal processing in comparison with the prior art, with the advantages of lower cost and a reduced requirement for mounting space.

Furthermore, DC current signal Idc' of current detection means 35 can serve both for detection and protection from overcurrent and overload, as well as for measurement for output display purposes. It is therefore possible to achieve the different objects of current feedback control, protection against overcurrent and overload, and measurement with a single current detection means 36. This further reduces costs and greatly reduces the amount of mounting space required.

The detection current signal I of current sampling and hold circuit 51 is detected as current signals Iu, Iv and Iw for each phase U, V and W. A layout could therefore be adopted to perform for example PWM control of inverter circuit 29, as conventionally, by obtaining a current command signal by detecting the difference between the speed command signal and the detected speed signal of brushless motor 20. PWM control is then carried out in accordance with the magnitude of a deviation current value obtained by calculating the deviation between this current command signal that is thus obtained and currents Iu, Iv and Iw flowing in each phase of the brushless motor 20.

Although in the above embodiment the case was described where a three-phase synchronous electric motor was used as the AC electric motor, multi-phase electric motors other than this could be employed. In such cases, inversion of pulse signal $P\theta$ is performed at intervals of a prescribed electric angle set by the number of phases, instead of being performed at intervals of electric angle of 60 degrees.

Figure 6:
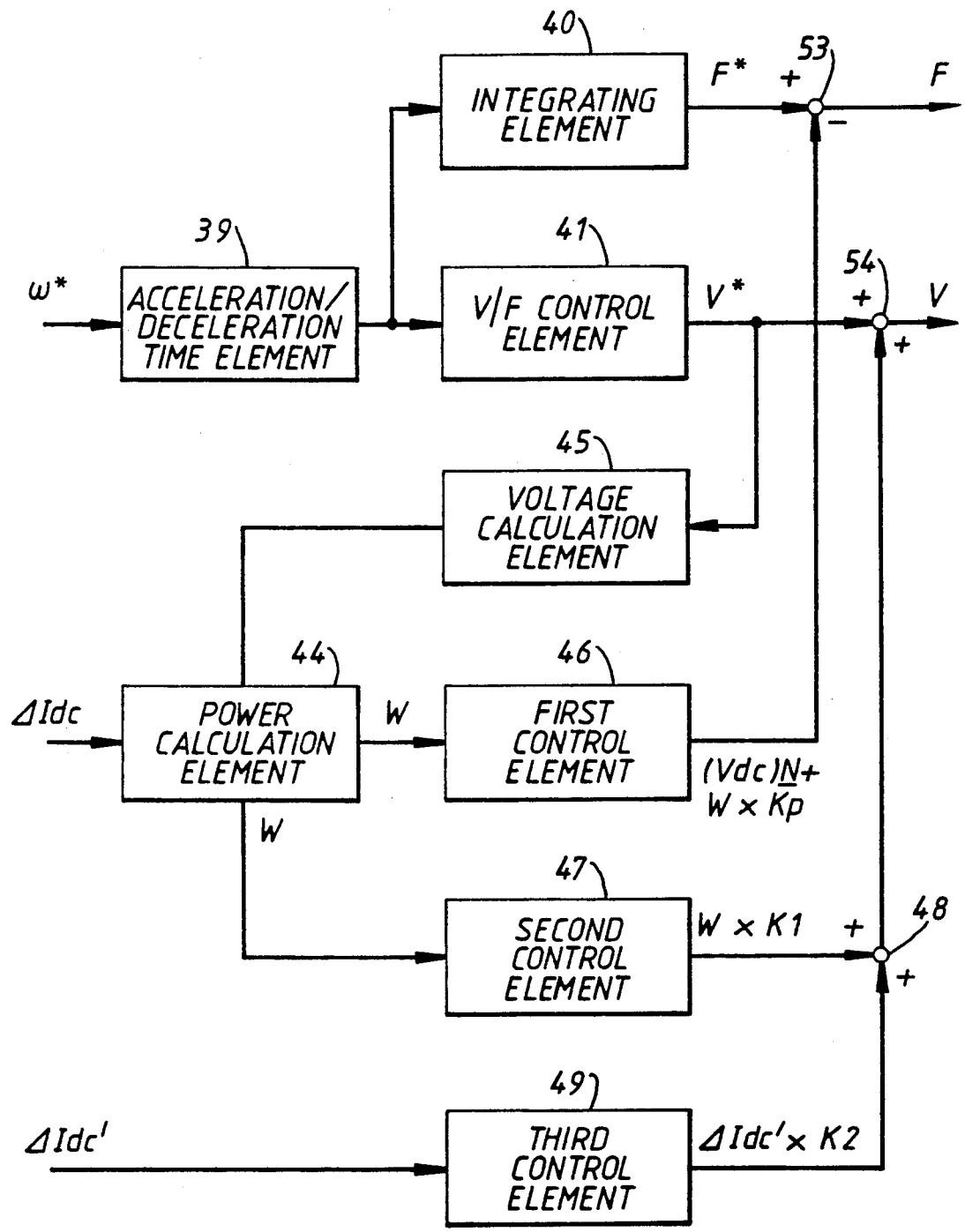
FIG. 6 is a block diagram showing an example layout of a voltage frequency calculation circuit according to a second embodiment of the invention.

A second embodiment of this invention will now be described with reference to FIG. 6.

Figure 2:
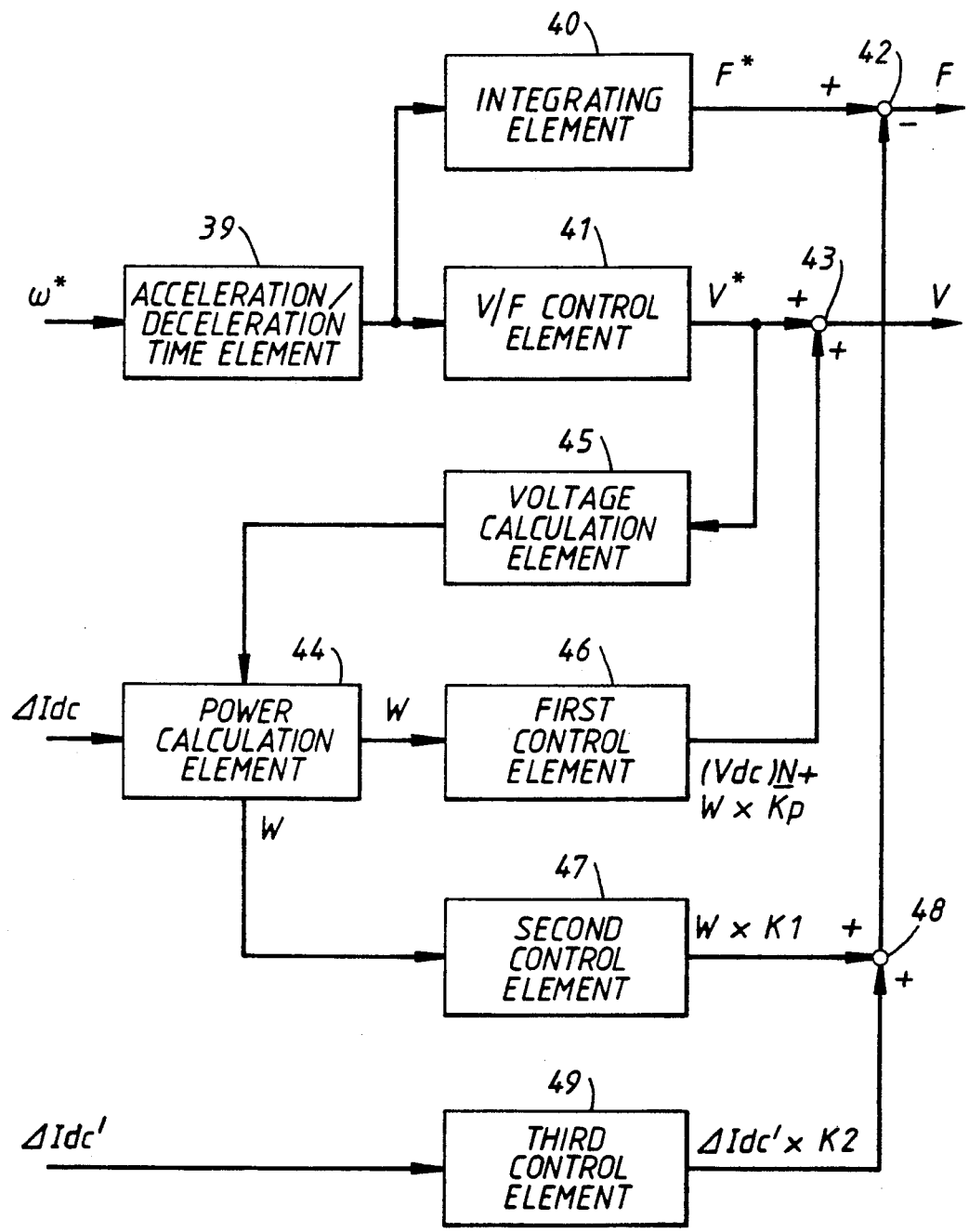
FIG. 2 is a block diagram showing an example layout of a voltage frequency calculation circuit of a first embodiment of the present invention.

Parts which are the same as those in FIG. 2 are given the same reference numerals. The difference in FIG. 2 lies in that the output of integrating element 40 and the output of first control element 45 are respectively applied to the positive (+) input terminal and the negative (−) input terminal of subtractor 53, and the output of V/F control element 41 and the output of adder 48 are respectively applied to the two positive (+) input terminals of adder 54.

As a result, the voltage signal V that is output from adder 54 is:

$$V = V^* + (W \times K1 + \Delta Idc' \times K2) \qquad (9)$$

and the frequency signal F that is output from subtractor 53 is:

$$F = F^* - [(Vdc)N + W \times Kp] \qquad (10)$$

so that the frequency signal F provides PI control.

The result is that, whereas, in the first embodiment, mainly voltage control was performed in respect of load fluctuations, in this second embodiment, mainly phase control is performed in respect of load fluctuations.

It should be noted that, although in the above embodiments the drive devices were indicated in the Figures by blocks of respective functions, for example power factor calculation circuit 36 and V/F calculation circuit 37 could alternatively be implemented in a microcomputer.

A third embodiment of this invention will now be described with reference to FIGS. 7 through 11.

Parts which are the same as in FIG. 1 are given the same reference numerals.

Figure 7:
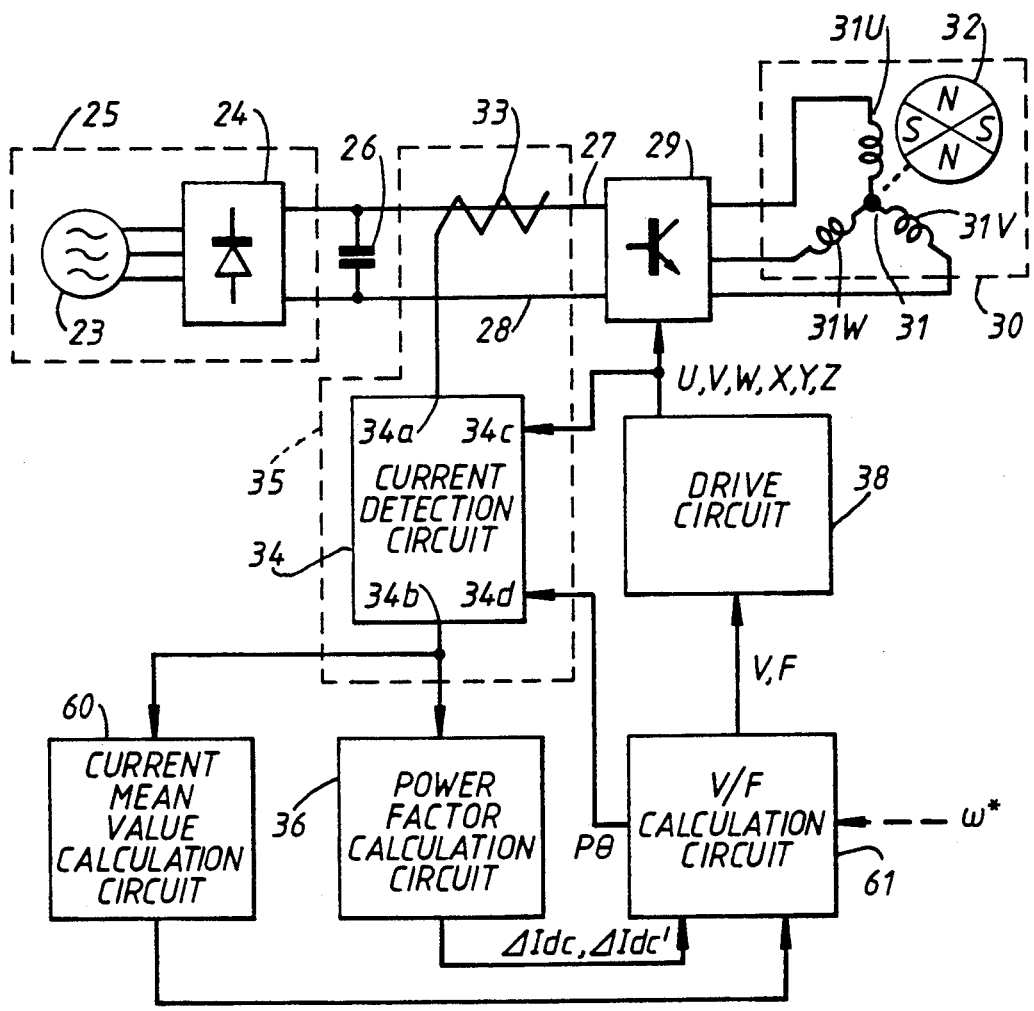
FIG. 7 is a block diagram showing an overall electrical layout of a third embodiment of the invention.

As shown in FIG. 7, the main circuit functions are that a three-phase AC power source 23 is converted to DC by a rectifier circuit 24 and capacitor 26, and this DC is converted to AC by an inverter circuit 29 in order to drive brushless motor 30. The control unit includes: a current detector 33 that detects the current in the DC part of inverter circuit 29; a current detection circuit 34 that amplifies the detected current from this current detector 33 and performs waveform shaping by a sampling and hold action; a power factor calculator circuit 36 that calculates the power factor from the output signal of this current detection 34; a current mean value calculation circuit 60 that calculates the mean value of the output signal from current detection circuit 34; a V/F calculation circuit 61 that calculates the V/F control amount from at least one of the results calculated by power factor calculation circuit 36 and current mean value calculation circuit 60; and a drive circuit 38 that output a control signal to a switching element, for example a transistor (not shown) of inverter circuit 26, based on the control amount generated by this V/F calculation circuit 61.

In this embodiment constructed as above, the current flowing in the DC link section in which conversion is effected from DC to AC is detected by current detector 33, and the detected value is sent to current detection circuit 34, where waveform shaping is carried out by performing an amplification and sampling and holding action. Since a difference of power factor is produced, in order to effect operation with a power factor of approximately 1, as described above, it is necessary to control the difference (Ib−Ia) of the DC currents to be zero. (In the case of a cage-type induction motor (Ib−Ia) is controlled to be an arbitrary value so as to allow use of an arbitrarily selectable input power factor).

Power factor calculation circuit 36 therefore calculates the power factor in terms of a difference of currents, just as in the first and second embodiments described above.

Since the amount by which the DC current changes is detected at intervals of an electric angle of 60 degrees of the output frequency, in calculation of the power factor, the previously detected change is held for an interval of electric angle 60 degrees.

Accordingly, current mean value calculation circuit 60 inputs the current signal obtained from current detection circuit 34, finds the mean value of the current and continuously calculates the change of current in said interval of electric angle 60 degrees, thereby generating a control amount which it inputs to the V/F calculation circuit 61 constituting the next stage.

By the above operation, loss of synchronization can be prevented and stable control achieved even under abrupt load changes in the low frequency range, since current change (which may be approximated to by power change) is constantly being detected.

Next, this current mean value calculation circuit 60 will be described in detail with reference to the drawings.

Figure 8:
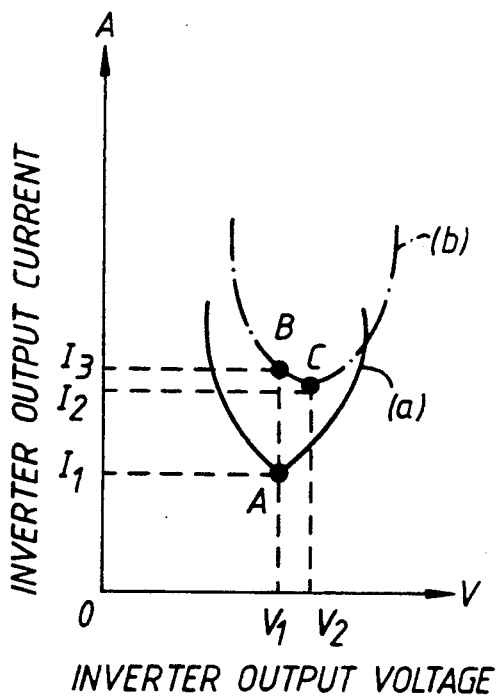
FIG. 8 is a graph showing load characteristic of a permanent magnet type motor under sudden change of load of the third embodiment of the invention.

In FIG. 8, when, during operation at point A on curve (a), the load increases, so that operation shifts to curve (b), voltage control by power factor calculation is not performed during the internal corresponding to an electric angle of 60 degrees, so, although operation shifts from point A to point B, during this time, current mean value calculation circuit 60 increases the inverter output current from I1 to I3, with the result that an amount ΔV (very small voltage=V2−V1) is added to the output voltage V, i.e., control is performed that effects a shift of operation from point B on curve (b) to point C.

Figure 10:
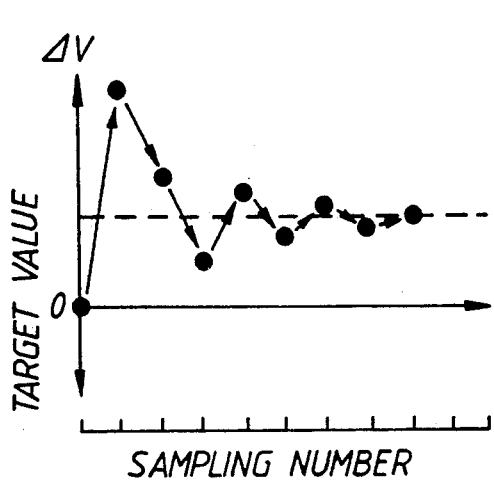
Figure 11:
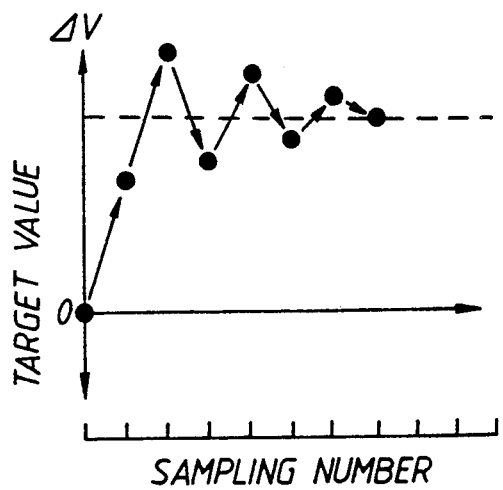

The method of adding this ΔV will now be described with reference to FIGS. 9 through 11.

During the interval corresponding to electric angle 60 degrees, the point at which the power factor becomes approximately 1 cannot be found, so operation is effected such that the inverter output current during this period is a minimum, by adding a suitable ΔV determined in accordance with the amount of change of inverter output current.

Figure 9:
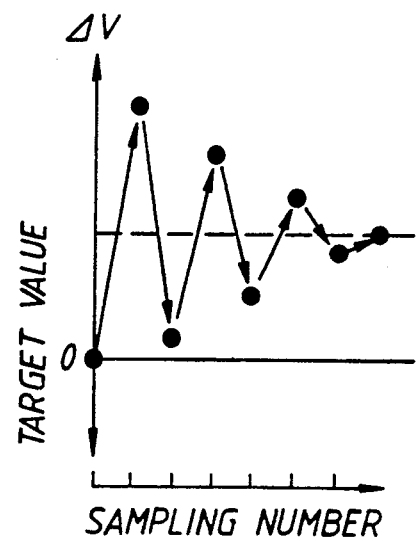
FIG. 9 to FIG. 11 are views showing action of a current mean value calculation means of load of the third embodiment of the invention.

For example, FIG. 9 shows an example in which the value of ΔV that is added is varied such that the inverter output current converges to a minimum target value. The current decreases and increases in a repetitive manner each time ΔV is applied, as it converges to the target value. In FIG. 10, successive additions of ΔV cause the current to increase, decrease, then decrease, this sequence being repeated thereafter. Apart from this, various methods of making the above-mentioned ΔV converge to a target value have been considered. However, in terms of power factor, the most stable type of control is obtained by shifting operation as far as possible from a lag power factor to a point at which the power factor becomes approximately 1.

As described above, with this embodiment, it is possible to prevent loss of synchronization even when there is an abrupt change of load during the electric angle interval of 60 degrees, i.e., in a region in which the power factor cannot be detected, by using current mean value calculation circuit 60 to apply suitable voltage values (i.e., suitable in that they make the current a minimum). In the case of a cage-type motor, control response to abrupt changes in load can likewise be improved.

Next, a fourth embodiment of this invention will be described with reference to FIG. 12 and FIG. 13.

Parts which are the same as in FIG. 7 are given the same reference numerals.

Figure 12:
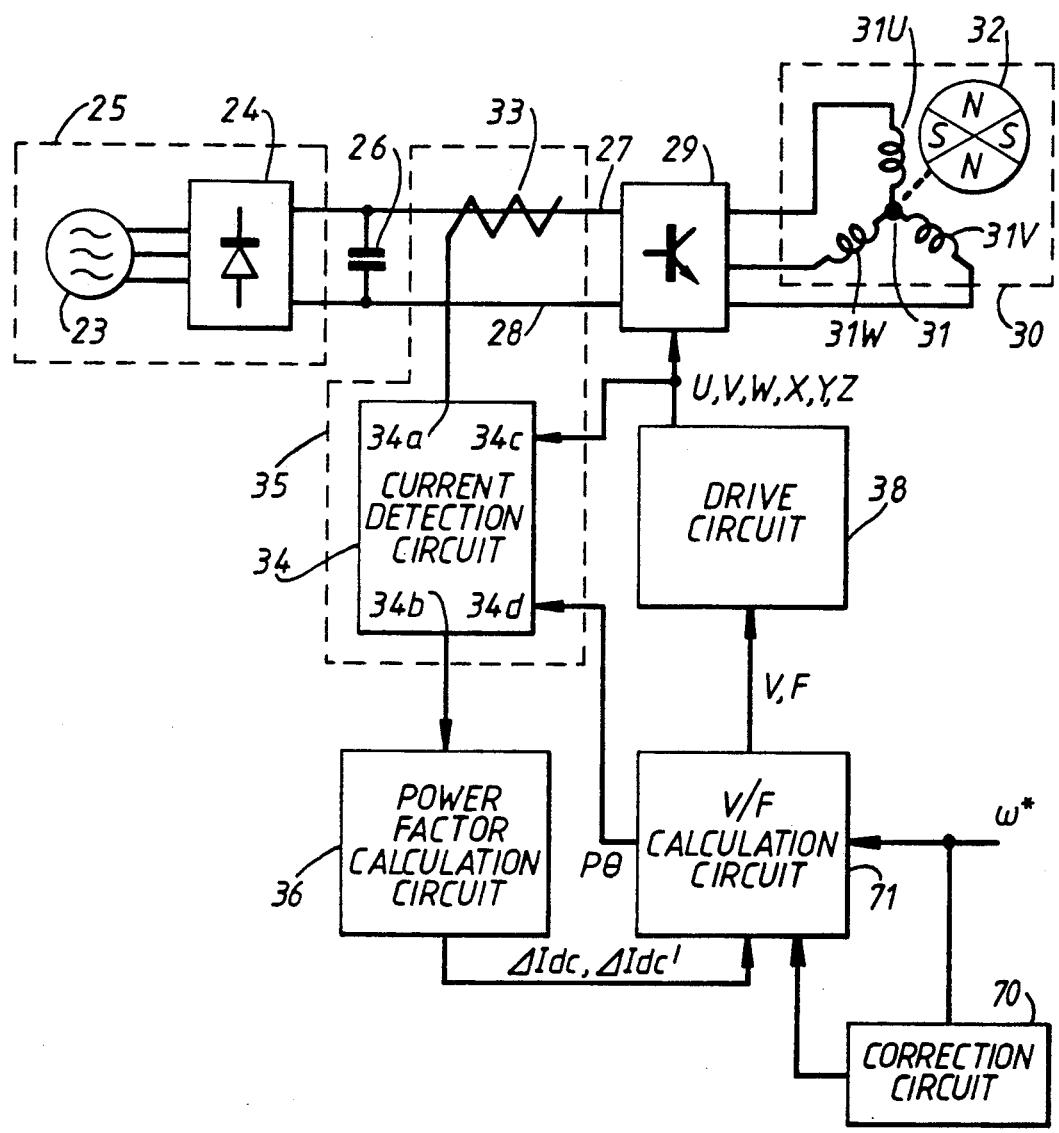
FIG. 12 is a block diagram showing an overall electrical layout of a fourth embodiment of the invention.

As shown in FIG. 12, the main circuit layout in this embodiment is as follows. For drive control of the permanent magnet type motor 30, a three-phase AC power source 23 is converted to DC by a rectifier circuit 24 and capacitor 16. This DC is converted to AC by an inverter circuit 29 and used to drive motor 30. The layout of this control unit includes: a current detector 33 that detects the current on the DC side of inverter circuit 29; a current detection circuit 34 that performs waveform shaping by an amplification and sampling and hold action, etc., on the detection current from current detector 33; a power factor calculation circuit 36 that calculates the power factor based on the output signal from this current detection circuit 34; a correction circuit 70 that calculates the prescribed control gain from a speed command value ω*; a V/F calculation signal 71 that calculates the V/F control amount from the speed command value ω* and the calculation results of power factor calculation circuit 36 and correction circuit 70; and a drive circuit 38 that outputs a control signal to the transistors (not shown) that are the switching elements of inverter circuit 29, based on the control amount generated by V/F calculation circuit 71.

With such a circuit layout, when the current flowing in the DC link that converts the DC to AC is detected by current detector 33 and waveform shaping is performed by inputting this to current detection circuit 34 and performing an amplification and sampling and hold action, etc., a difference of power factor is created. It is therefore necessary to control the difference of the DC current (Ib−Ia) such that it becomes zero, in order to operate with a power factor of approximately 1. Power factor calculation circuit 36 therefore calculates this current difference as a power factor.

This difference is input to V/F calculation circuit 71. V/F calculation circuit 71 also receives the value obtained from correction circuit 70.

Correction circuit 70 also receives the speed command value ω*, which is a means of altering the control gain of V/F calculation circuit 71 in accordance with the speed.

This operation will now be described with reference to FIG. 13.

V/F calculation circuit 71 performs voltage control and frequency control for example in accordance with the following equations in the same way as in the previous embodiments:

$$V1 = V1^* + K3 \times \Delta Idc' + V2 \tag{11}$$

$$[V2 = V2 + K4 \times \Delta Idc'] \tag{12}$$

(V1: output voltage, V1*: command voltage, ΔIdc': change of DC current corresponding to power factor, V2: integrated value, K3: proportional gain constant, K4: integrated gain constant).

$$F1 = F1^* + K5 \times \Delta Idc' \tag{13}$$

(F1: output frequency, F1*: command frequency, K5* proportional gain constant.

This indicates that the voltage control is proportional integral control, while the frequency control is proportional control.

Control gains (K3, K4, K5) are constants, but these control gains are made variable by correction circuit 7 as described above.

Figure 13:
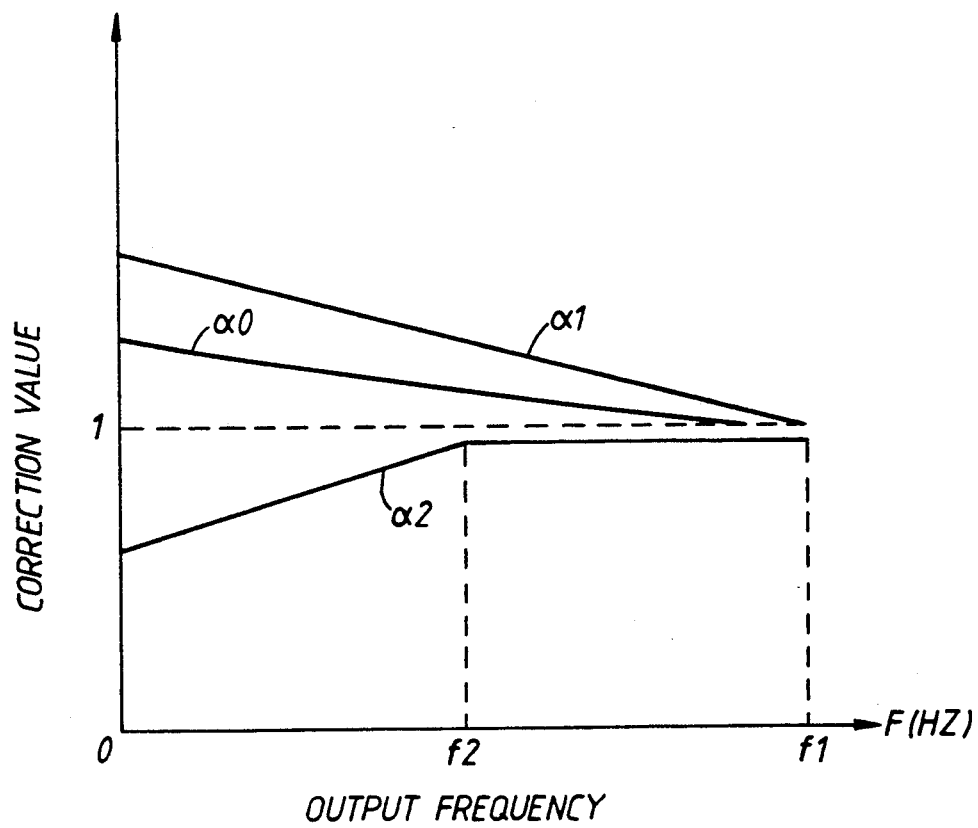
FIG. 13 is a view showing a relationship between output frequency and compensation amount of the fourth embodiment of the invention.

For example, FIG. 13 shows a correction for output frequency of the drive device. The correction amounts can be altered to any desired values in accordance with output frequency.

The control gains given above are therefore substituted as follows:

$$K3' = K3 \times a0 \tag{14}$$

$$K4' = K4 \times a1 \tag{15}$$

$$K5' = K5 \times a2 \tag{16}$$

Voltage control and frequency control are therefore carried out in accordance with the following equations:

$$V1 = V1^* + K3' \times \Delta Idc' + V2 \tag{17}$$

$$[V2 = V2^* + K4' \times \Delta Idc'] \tag{18}$$

$$F1 = F1^* + K5' \times \Delta Idc' \tag{19}$$

With the above method, as the output frequency rises the control gain corresponding to for example K3' falls, since α0 gets smaller (α1 shows the same behavior). In contrast, α2 increased with increased output frequency, and is made to have a fixed value between f2 and f1. In low frequency operation (low speed operation), the gain of the voltage control is therefore high, while the gain of the frequency control is low. This therefore improves response to load fluctuations.

Thus the various control gains can be altered to any desired values.

If, for example, α0, α1, and α2 are each set to 1, a system results which is identical to the prior art system.

Thus, with this embodiment, controllability at each frequency can be altered by setting the correction amounts of correction circuit 70 to any desired values, determined in accordance with the electric motor and/or load which are to be controlled.

It should be noted that, although, in this embodiment, the correction amounts were made proportional and inversely proportional to frequency, the invention is not restricted to this, and these correction amounts could be set to any desired value. In addition, it could be arranged for these values to show hysteresis when the frequency rises or when the frequency drops.

Next, an embodiment wherein this invention is applied to a three-phases induction motor will be described.

Figure 14:
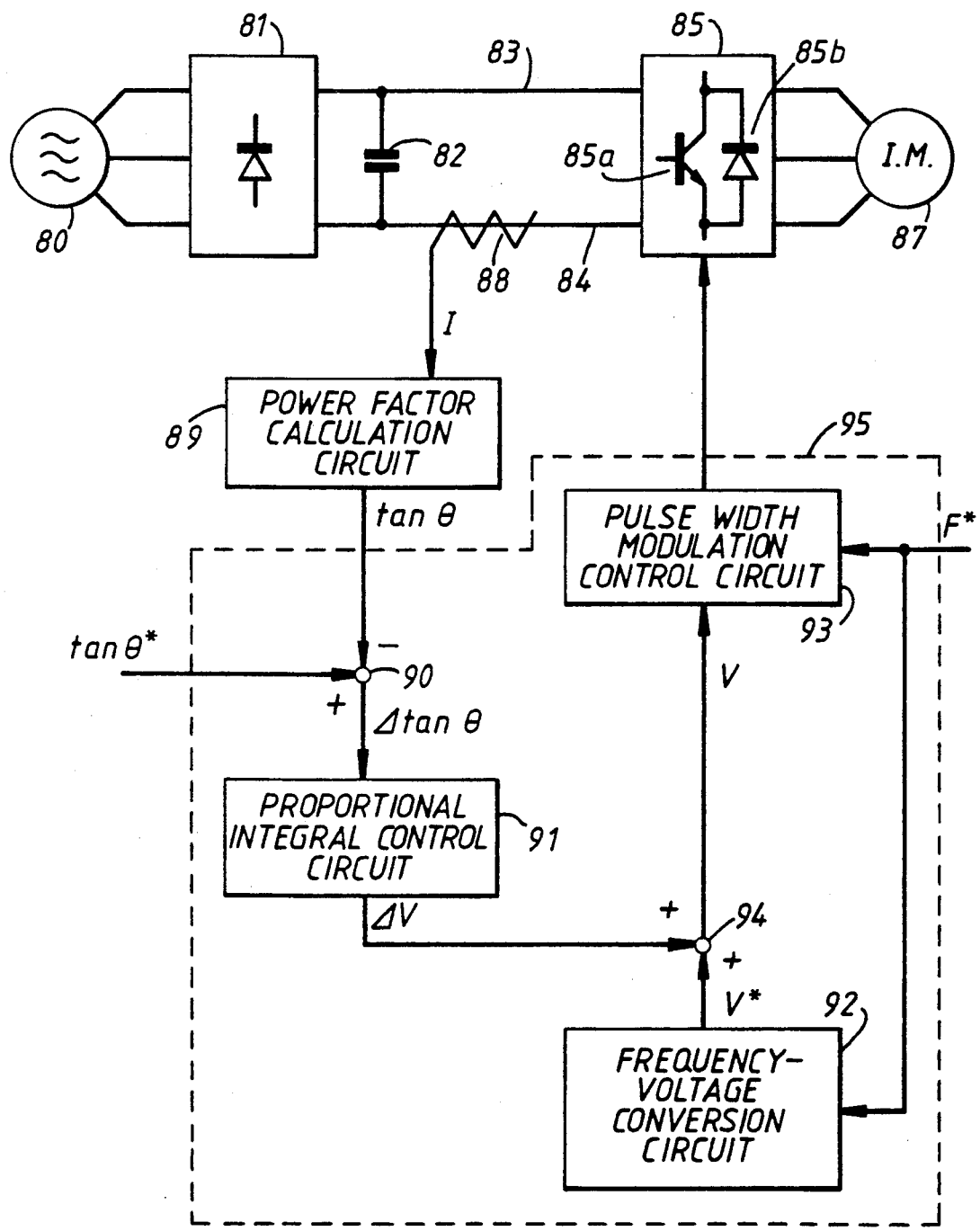
FIG. 14 is a block diagram showing a fifth embodiment of the invention.
Figure 15:
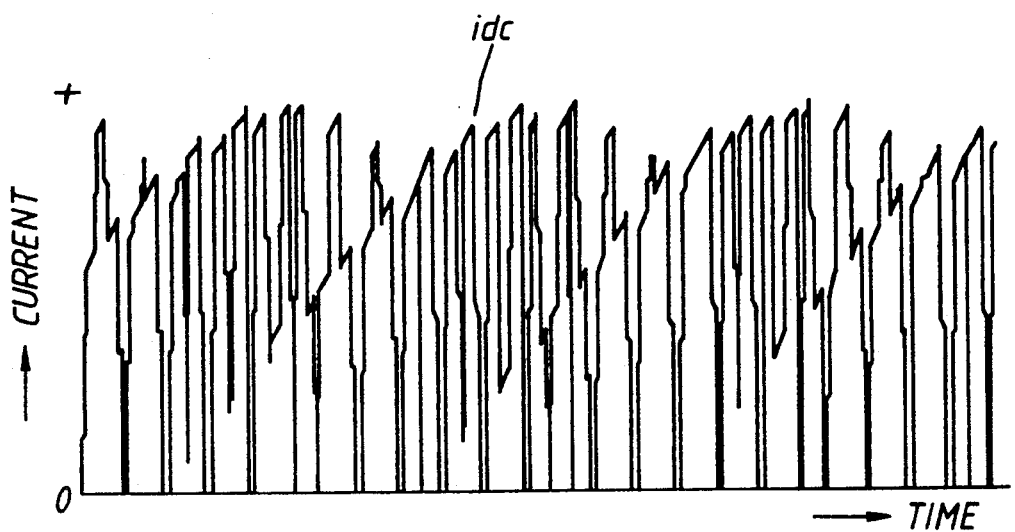
FIG. 15 is a current waveform diagram given in explanation of an operation the fifth embodiment of the invention.
Figure 15:
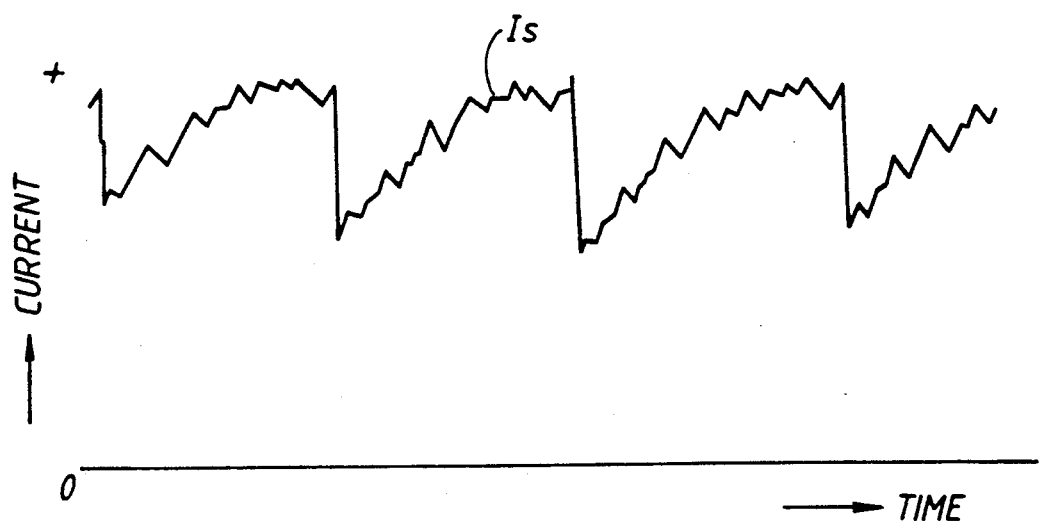

This fifth embodiment will be described below with reference to FIG. 14 and FIG. 15.

First of all, the overall layout will be described with reference to FIG. 14. Numeral 80 denotes a three-phase AC power source. A full wave rectifier circuit 81 pexforms full wave rectification on the three-phase AC voltage from this three-phase AC power source 80. A smoothing capacitor 82 smooths the rectified voltage from this full wave rectification circuit 81 to produce a DC voltage which is applied between DC buses 83 and 84. Numeral 85 denotes a main inverter circuit, to the input terminals of which is applied the CD voltage between these DC buses 83 and 84. These elements together form a voltage type PWM inverter 86. Main inverter circuit 85 is constituted of a plurality of switching elements e.g. six power transistors 85a connected in a three-phase bridge connection, diodes 85b being connected in anti-parallel to each of these power transistors 85a, three-phase AC voltage being supplied from their output terminals to three-phase induction motor 87. A current detection circuit 88 is comprised of a Hall CT as current detection means. This detects the current Idc flowing in DC bus 84 of inverter 86 and outputs a detection current I in response to it. A power factor calculation circuit 89 has the detection current I from current detection circuit 88 supplied to its input terminal and performs a calculation as described below, as a result of which it outputs from its output terminal the tangential component tan θ of the power factor angle θ. A subtractor 90 has the tangential component tan θ from power factor calculation circuit 89 supplied to its negative (−) input terminal, and the tangential component tan θ* of power factor angle command value θ* supplied to its positive (+) input terminal, and, as a result, outputs the difference of these, Δtan θ, from its output terminal. A proportional integral (PI) control circuit 91 has the difference Δtan θ from subtractor 90 supplied to its input terminal, and outputs from its output terminal a voltage correction value ΔV. An adder 94 receives at one of its positive (+) input terminals the voltage correction value ΔV from proportional integral control circuit 91 and receives at its other positive (+) input terminal the voltage command value V* from frequency-voltage (V/F) conversion circuit 92, as a result of which it outputs voltage command value v from its output terminal. In this case, frequency-voltage conversion circuit 92 receives at its input terminal frequency command value F* and outputs from its output terminal a voltage command value V* corresponding to frequency command value F*. Numerical 93 denotes a pulse width modulation (PWM) control circuit. This receives at one of its input terminals the voltage command value V from the adder 94, and receives at its other input terminal frequency command value F*. It generates from its output terminal a pulse width modulation signal corresponding to voltage command value V and frequency command value F*, and supplies this to the base of power transistor 85a of main inverter circuit 85 as a drive signal. Inverter control means 95 includes the adder 90, the proportional integral control circuit 91, the frequency-voltage conversion circuit 92, the pulse width modulation control circuit 93 and the adder 94 described above.

Next, the operation of this embodiment will be described with reference to FIG. 15.

On initial start-up of three-phase induction motor 87, frequency command value F* is supplied to pulse width modulation control circuit 93. Also, frequency command value F* is converted to a voltage command value V* by frequency-voltage conversion circuit 92, and this voltage command value V* is supplied through adder 94 as voltage command value V to pulse width modulation control circuit 93. In response, pulse width modulation control circuit 93 outputs a pulse width modulation signal corresponding to voltage command value V (V*) and frequency command value F* as a drive signal and supplies it to the base of power transistor 85a of inverter circuit 85. In response to this, inverter circuit 85 performs a switching action, as a result of which it outputs three-phase AC voltage of output voltage and output frequency corresponding to the aforementioned voltage command value V and frequency command value F*. This is supplied to the three phase induction motor. Current therefore flows in each phase of the three-phase induction motor 87 and a current Idc flows as shown in FIG. 15(a) in the DC bus 84 of inverter 86. This current Idc is detected by current detection circuit 88, and a detection current I corresponding to this is supplied to power factor calculation circuit 89.

Since the current Idc is the current flowing in DC bus 84 when one of the three-phase currents (depending on the switching condition of inverter circuit 85) flowing in three-phase induction motor 87 is selected, it is possible to detect one phase of the current flowing in three phase induction motor 87 by extracting it by sampling this at a specific timing obtained from the output pulse modulation voltage waveform. Also, when current Idc is sampled, a sampled waveform Is as shown in FIG. 15(b) is obtained, assuming that this samples phase is successively switched only during a period of 60 degrees of the voltage phase peak. Thus, the timing with which sampling is performed is synchronized with the output pulse width modulation voltage, so, if the power factor is 1, the sampled waveform Is is the waveform obtained by full wave rectification of the three-phase current flowing in three-phase induction motor 87, and is a continuous waveform. However, in the ordinary case of a lagging power factor, the sampled waveform Is, as shown in FIG. 15(b), is a waveform which is discontinuous at the time-point of the phase changeover. The current values before and after the time-point of this phase changeover are in close relationship with the power factor, so they can be formalized as follows, assuming that the three-phase current flowing in the three-phase induction motor 87 is a symmetrical sine wave.

Specifically, assuming that the current value immediately before the time-point of the phase changeover is Ia, and the current value immediately after it is Ib, $\theta$ is the power factor angle (taking lagging angles as positive), and IM is the peak value of the current flowing in the three-phase induction motor 87, we have:

$$Ia = IM \times \cos(\theta - 30 \text{ degrees}) \qquad (20)$$

$$Ib = IM \times \cos(\theta + 30 \text{ degrees}) \qquad (21)$$

Calculating (Ia−Ib)/(Ia+Ib) from these equations (20) and (21), we have:

$$\tan\theta = \sqrt{3} \times (Ia - Ib)/(Ia + Ib) \qquad (22)$$

That is, the power factor can be determined independently of the current IM of the three-phase induction motor 87. Power factor calculation circuit 89 performs the calculation of equation (22) after the above-mentioned sampling waveform Is has been obtained. However, it must be pointed out that if the power factor $\theta$ is 90 degrees, (Ia+Ib) in equation (23) becomes zero, making this equation impossible to calculate. Even if the power factor angle $\theta$ does not reach 90 degrees, if it is sufficiently large, errors in current detection have a disproportionate effect on the results of the power factor calculation. In this embodiment. Therefore the range of setting of the power factor angle command value $\theta^*$ is specified to be not more than 60 degrees (for example, 45), i.e., restriction is imposed such that the power factor angle $\theta$ does not get too large.

The tangential component tan $\theta$ of the power factor angle calculated by power factor calculation circuit 89 is supplied to subtractor 90, and subtractor 90 performs a subtraction:

$$\tan \theta^* - \tan \theta = \Delta \tan \theta,$$

and outputs the difference $\Delta\tan\theta$. When proportional integral control circuit 91 receives the difference $\Delta\tan\theta$ from subtractor 90, it outputs a voltage correction value $\Delta V$ such that difference $\Delta\tan\theta$ asymptotically approaches zero, as described below. This is added to the voltage command value $V^*$ by adder 94 and output as the voltage command value $V$ (=$V^*+\Delta V$) after correction. In the case of three-phase induction motor 87, when the ratio of voltage to frequency rises, the excitation current increases, causing the phase lag of the current with respect to the voltage to become large, with the result that the power factor angle $\theta$ increases. Consequently, in proportional integral control circuit 91, when the tangential part tan $\theta$ of power factor angle $\theta$ becomes too large in comparison the tangential part tan $\theta^*$ of power factor angle command value $\theta^*$, voltage correction value $\Delta V$ is made small, and, in contrast, when tangential part tan $\theta$ becomes too large in comparison to tangential part tan $\theta^*$, voltage correction value $\Delta V$ is controlled so that it becomes larger. In this way, in inverter circuit 85, the output voltage is controlled by pulse width modulation such that the tangential part tan $\theta$ is equal to the tangential part tan $\theta^*$, i.e., the power factor angle is equal to the power factor angle command value $\theta^*$.

With this embodiment, the following benefits can be obtained.

Specifically, by detecting the current Idc flowing in DC bus 84 of inverter 86 by means of current detection circuit 88, the output voltage of inverter circuit 85 is controlled by power factor calculation circuit 89 in accordance with the detection current I of detection circuit 88, such that the tangential part tan $\theta$ of the power factor angle $\theta$ is equal to the tangential part tan $\theta^*$ of the power factor angle command value $\theta^*$. In contrast to the prior art, power factor control can therefore be achieved based on the current flowing in the three-phase induction motor 87 rather than on the change in power. Inverter 86 can therefore control in a stable manner the drive of three-phase induction motor 87 even in low speed operation. Sufficient accuracy is obtained even in low speed operation, due to the elimination of elements depending on speed of operation of three-phase induction motor 87 from the control system. In particular, it is well known that for the commonly employed inductive motors, torque efficiency is a maximum in the vicinity of a power angle $\theta$ of 45 degrees. Operation with high torque efficiency can therefore be achieved by using the inverter control means 95 to control the power factor angle $\theta$ such that it is equal to a power factor angle command value $\theta^*$ (e.g., 45 degrees) of less than 60 degrees. Furthermore, with such control of the power factor angle $\theta$, it is easy to set the power factor angle command value $\theta^*$ such that the power factor angle $\theta$ does not become lower than a predetermined value. Under heavy load, etc., it is therefore possible to prevent loss of speed due to overcurrent, since it is possible to prevent the slippage of the three-phase induction motor 87 shifting to an excessively high slippage condition above the maximum torque point.

Figure 16:
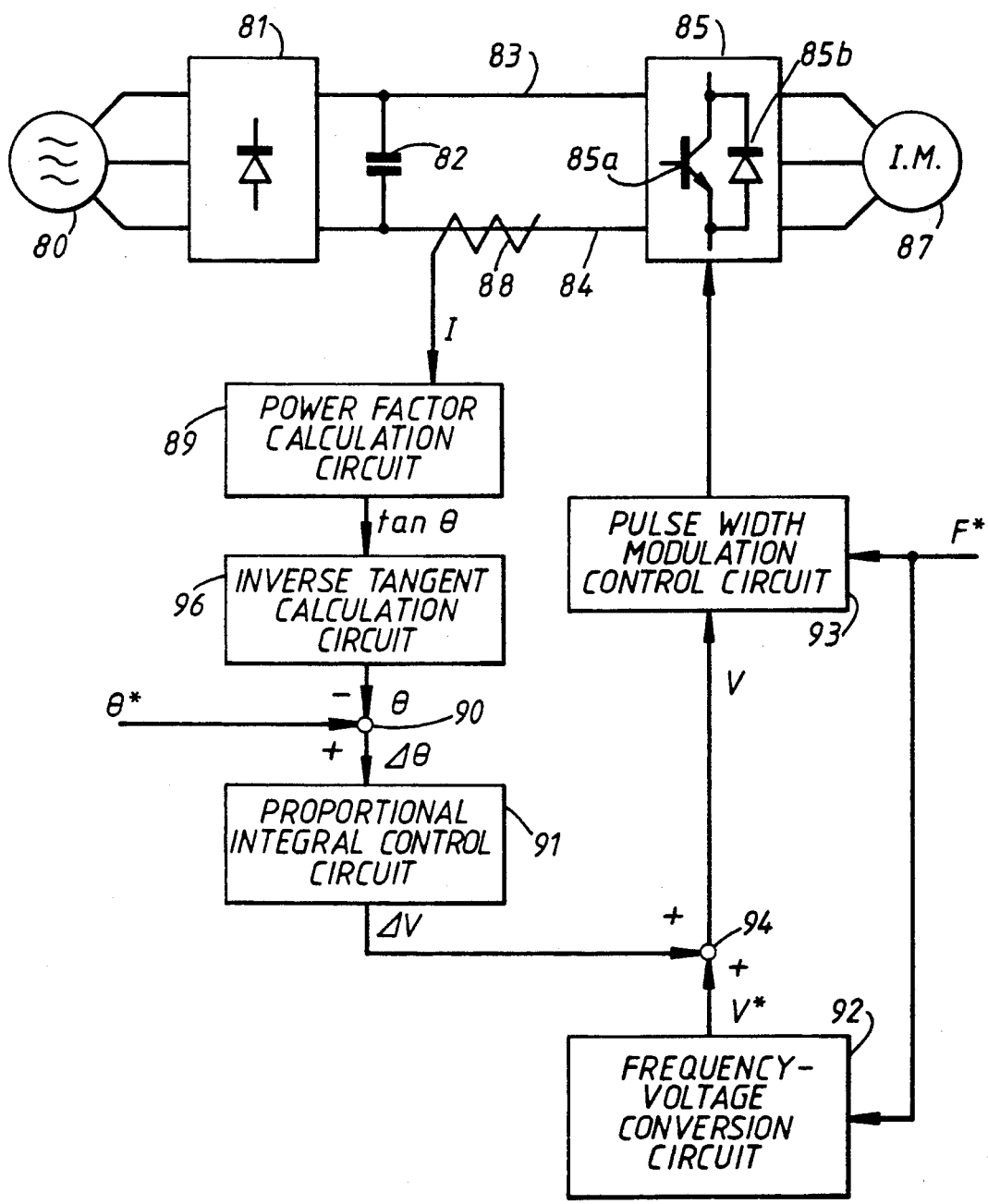
FIG. 16 is a block diagram of an overall electrical layout showing a sixth embodiment of the invention.

FIG. 16 shows a sixth embodiment of this invention. Parts which are the same as in FIG. 14 are given the same reference numerals, and only the parts which are different will be described hereinbelow.

Specifically, numeral 96 denotes an inverse tangent (tan−1) calculation circuit. This receives at its input terminal the tangential component tan $\theta$ from power factor calculation circuit 89. Inverse tangent calculating circuit 96 converts the tangential component tan $\theta$ that it receives as input into a power factor angle $\theta$, which it outputs from its output terminal. This power factor angle $\theta$ is then supplied to the negative (−) input terminal of subtractor 90. Instead of tangential component tan $\theta^*$, the positive (+) input terminal of subtractor 90 is supplied with power factor angle command value $\theta^*$, so subtractor 90 outputs the difference of these, i.e., $\Delta\theta$ (=$\theta^*-\theta$) from its output terminal, and supplies this difference to proportional integral control circuit 91.

Proportional integral control circuit 91 outputs a voltage correction value $\Delta V$ such that this difference $\Delta V$ asymptotically approaches zero.

The same benefits are therefore obtained by this sixth embodiment as by the fifth embodiment described above.

Figure 17:
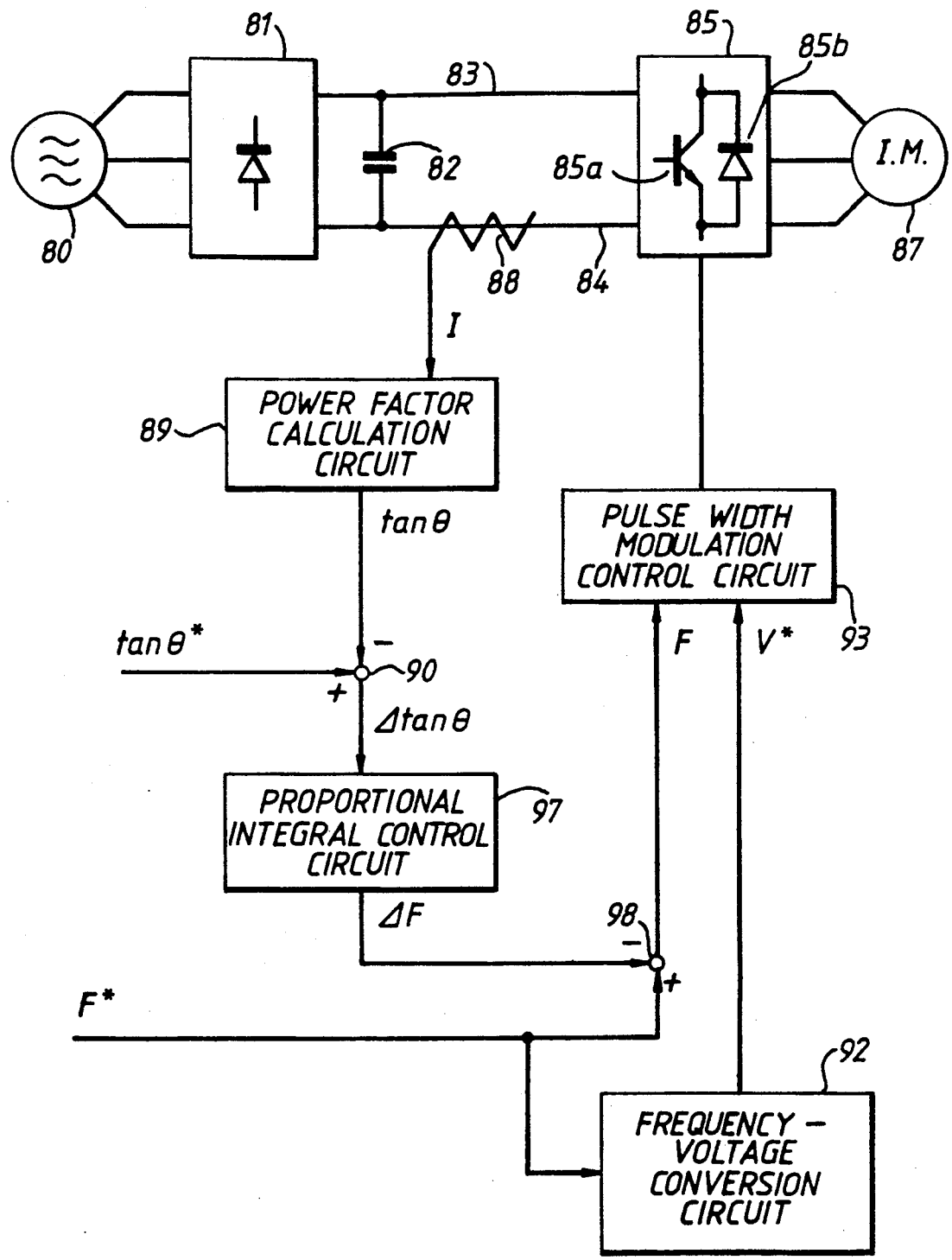
FIG. 17 is a block diagram showing an overall electrical layout of a seventh embodiment of the invention.

FIG. 17 shows a seventh embodiment of this invention. Parts which are the same as in FIG. 14 are given the same reference numerals, and only those parts which are different are described below.

Specifically, humeral 97 denotes a proportional integral control circuit replacing proportional integral control circuit 91. Its input terminal is supplied with difference Δtan θ from subtractor 90, and the circuit outputs frequency correction value ΔF. A subtractor 98 receives at its negative (−) input terminal frequency correction value ΔF, and, at its positive (+) input terminal, frequency command value F*, and outputs from its output terminal frequency command value F (=F* ΔF). One input terminal of pulse width modulation control circuit 93 is supplied with frequency command value F, while its other input terminal is directly supplied with voltage command value V* from frequency-voltage conversion circuit 92.

Thus, pulse width modulation control circuit 93 controls inverter circuit 85 in accordance with voltage command value V* and frequency command value F, such that it outputs a three-phase AC voltage of output voltage and output frequency corresponding to these. Proportional integral control circuit 97 outputs a frequency correction value ΔF such that the difference Δtan θ asymptotically approaches zero.

In this embodiment, therefore, the same effect as in the fifth embodiment is achieved by controlling the output frequency of inverter circuit 85 such that power factor angle θ is equal to power factor angle command value θ*.

The seventh embodiment is particularly effective when the power factor angle θ needs to increase when the output voltage has reached its maximum. It may therefore be used in combination with, for example, the fifth embodiment, in a layout wherein switching is effected such that the fifth embodiment is used below the base speed, and the seventh embodiment is used in the fixed output operating condition at speeds in excess of the base speed.

Finally, examples will be described wherein the detected current value is used to calculate the power value, and this power value is used to control the brushless motor.

Figure 18:
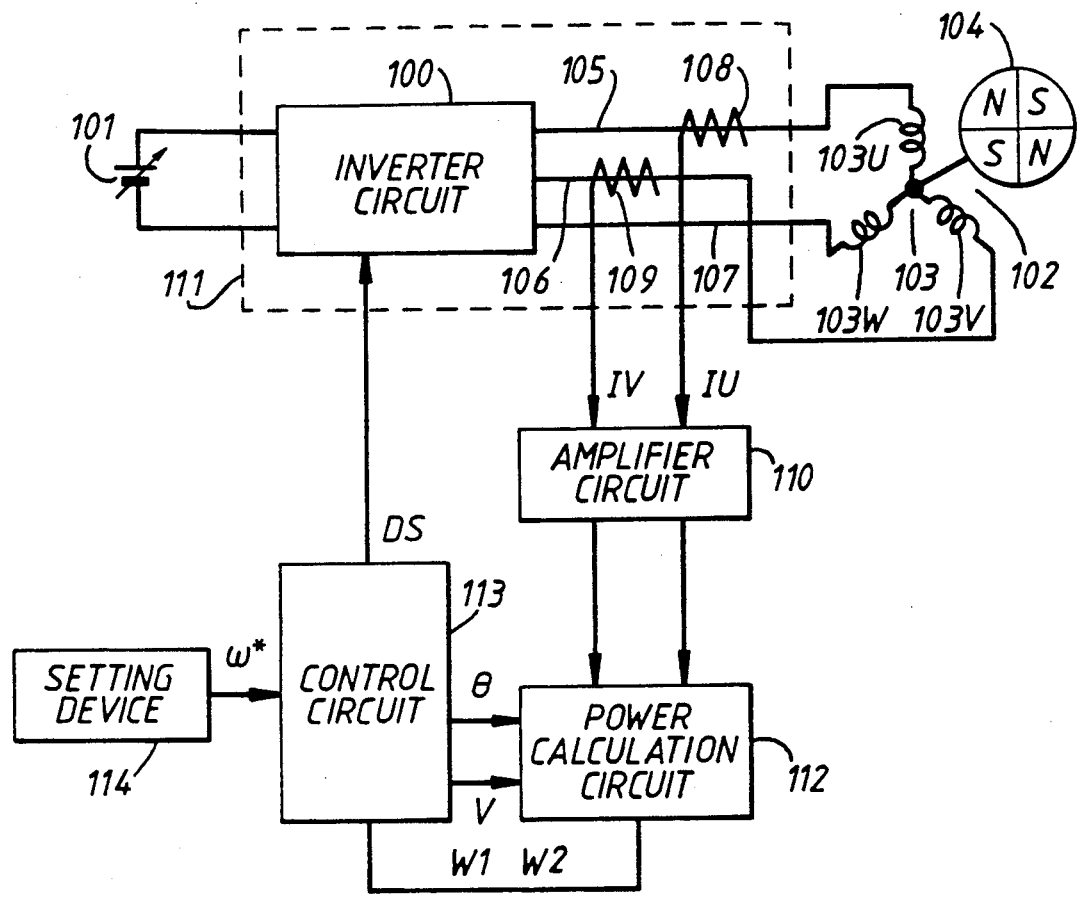
FIG. 18 is a block diagram showing an overall electrical layout of the present invention.

An eighth embodiment will now be described with reference to FIG. 18 to FIG. 20.

First, the overall layout will be described with reference to FIG. 18. An inverter circuit 100 includes a three-phase bridge connection of six switching elements formed by transistors. This is supplied with the DC voltage of DC power source 101 at its input terminal. A three-phase four-pole brushless motor 102, is equipped with a stator 103 provided with U, V and W phase stator coils 103U, 103V and 103W, and with a permanent magnet type rotor 104. Stator coils 103U, 103V and 103W are connected in a star connection, which is supplied with AC output voltage from the output terminals of inverter circuit 100 through output leads 105, 106 and 107. Numerals 108 and 109 denote current detectors consisting of Hall current transformers. These are respectively provided in the output leads 105 and 106 for the U phase and V phase. Numeral 100 denotes an amplifier circuit. Current detectors 108 and 109 amplifier circuit 100 form a current detection means 111. Current signals Iu and Iv detected by current detectors 108 and 109 are supplied to the input terminals of a power calculating means including power calculation circuit 112 through an amplifier circuit 110. As described below, power calculation circuit 112 uses current signals Iu and Iv to calculate power signals W1 and W2. Power signals W1 and W2 are output from an output terminal of power calculation circuit 112 and supplied to the input terminal of a control means including control circuit 113. Control circuit 113, as described below, uses power signals W1 and W2 and a speed command value ω* that is supplied from a setting device 114 to calculate voltage signal V and phase signal θ. These are in turn used to produce six PWM-controlled drive signals DS that are output from its output terminals and supplied to the bases of the six transistors of inverter circuit 100, causing the rotor 104 of brushless motor 102 to rotate with a speed of rotation designated by speed command value ω*.

The principles of operation of this embodiment will now be explained with reference to FIG. 19. FIG. 19 is a vector diagram showing the relationship of the phase voltage, phase current and line voltage in each phase. Eu, Ev and Ew are the U, V and W phase voltages, Iu, Iv and Iw are the U, V and W phase currents, and θ is the phase difference between the respective phase voltages Eu, Ev and Ew and the respective phase currents Iu, Iv and Iw. Euw and Evw are the line voltages referred to the W phase voltage Ew. Line voltage Euw has a phase difference ($-\pi/6$) with respect to the phase voltage Eu, and the line voltage Evw has a phase difference ($+\pi/6$) with respect to the phase voltage Ev.

When, from the above values, the power W1 and W2 are calculated by finding the product of the line voltage Euw and phase current Iu and the product of the line voltage Evw and phase current Iv, we obtain:

$$W1 = Euw \times Iv \times \cos(\theta - \pi/6) \tag{24}$$

$$W2 = Evw \times Iv \times \cos(\theta + \pi/6) \tag{25}$$

Figure 19:
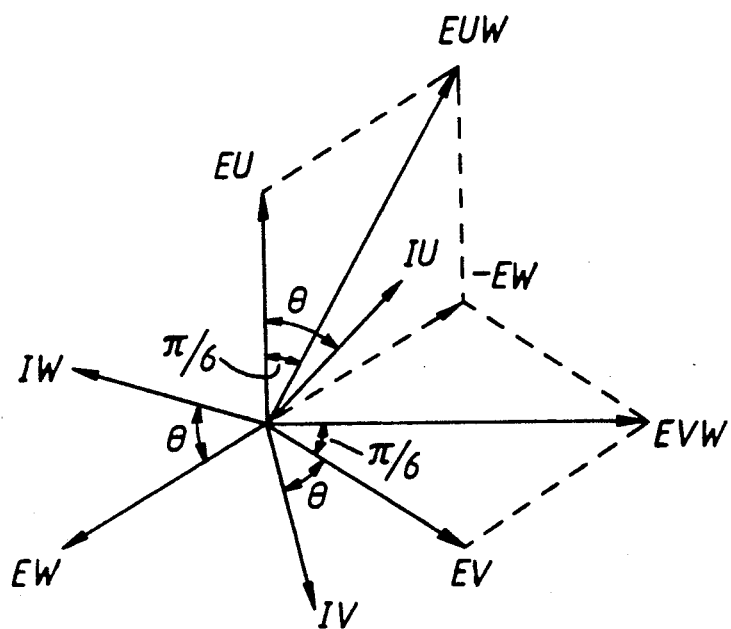
FIG. 19 is a vector diagram given in explanation of the principles of operation of the present invention.
Figure 20:
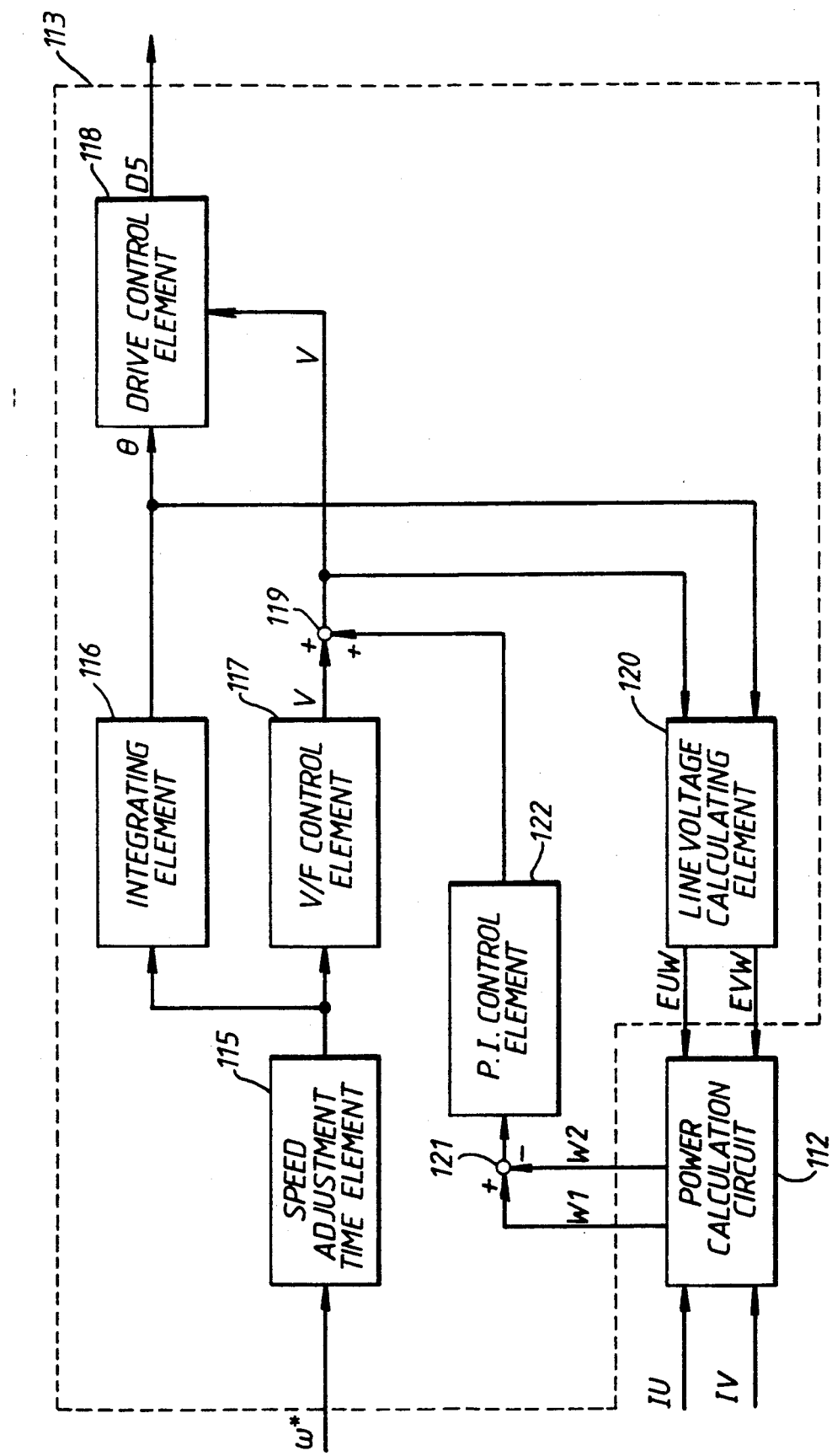
FIG. 20 is a block diagram showing an example layout of a control circuit of an eighth embodiment of the invention.

From the vector diagram shown in FIG. 19, converting the above equations (24) and (25), we have:

$$W1 = 3 \times Ev \times Iv \times \cos(\theta - \pi/6) \tag{26}$$

$$W2 = 3 \times Ev \times IV \times \cos(\theta + \pi/6) \tag{27}$$

In this case, in the three-phase equilibrium condition, Eu=Ev=Ew and Iu=Iv=Iw, so, putting Eu=Ev=E and Iu =Iv=I, equations (26) and (27) above become:

$$W1 = 3 \times E \times I \times \cos(\theta - \pi/6) \tag{28}$$

$$W2 = 3 \times E \times I \times \cos(\theta + \pi/6) \tag{29}$$

Finding the condition that power W1 and W2 are equal as between the two phases, we have:

$$\cos(\theta - \pi/6) = \cos(\theta + \pi/6) \tag{30}$$

$$= 0, \tag{31}$$

Consequently, as described above, the power factor can be controlled by controlling the passage of current to stator coils 103U, 103V and 103W such that the power W1 and W2 of the two phases are equal, and brushless motor 102 can thus be driven in the same way as conventionally.

The detailed construction of control circuit 113 for implementing the above operating principles will now be described with reference to FIG. 20. Speed command value ω* is applied to the respective input terminals of integrating element 116 and V/F control 117 through speed adjustment time element 115. Integrating element 116 outputs a phase signal θ from its output terminal and supplies this to the input terminal of drive control element 118. V/F control element 117 outputs a voltage command signal V from its output terminal and supplies this to one positive (+) input terminal of an adder 119. Adder 119 outputs a voltage signal V from its output terminal, as described below. This voltage signal V is supplied to an input terminal of drive control element 118, and is also supplied to an input terminal of line voltage calculating element 120. Line voltage calculating element 120 receives at its other input terminal a phase signal θ and uses this phase signal θ and voltage signal V to calculate line voltages Euw and Evw, which it supplies as signals to the input terminals of power calculation circuit 112. Power signals W1 and W2 from power calculation circuit 112 are respectively supplied to the positive (+) input terminal and negative (−) input terminal of subtractor 121, and the output signal from the output terminal of the subtractor 121 is supplied through a PI (proportional/integral) control element 122 to the other positive (+) input terminal of adder 119.

The operation of this embodiment will now be described.

In control circuit 113, when speed command value ω* is applied to speed adjustment time element 115, the output signal ω* of speed adjustment time element 115 rises for a speed adjustment time that can be specified at will by speed command value ω*. This is then integrated by integrating element 116 and output as phase signal θ. It is also compared with a V/P pattern, which can be chosen at will, by V/F control element 117, and output as voltage command signal V. The voltages to be applied to stator coils 113U and 113W can then be calculated from the phase signal θ that is output from integrating element 116 and the voltage signal V that is output from adder 119 that adds a correction to voltage command signal V. Line voltage calculating element 120 calculates these as line voltages Euw and Evw and applies them as signals to power calculation circuit 112. Power calculation circuit 112 calculates powers W1 and W2 as shown by equations (24) and (25) from the phase current signals Iu and Iv that are supplied from current detection means 111 and these line voltages Euw and Evw. These powers W1 and W2 are then fed back to control circuit 113 as signals and supplied to subtractor 121. Subtractor 121 finds the difference between these power signals W1 and W2 and supplies this difference signal to PI control element 122. PI control element 122 performs PI control such that this difference signal is zero or a predetermined value, its output being supplied to adder 119. Adder 119 outputs a voltage signal v by adding the output signal from PI control element 122 to voltage command signal V. The phase signal θ and voltage signal v which are thus obtained are supplied to drive control element 118. Drive control element 118 uses this phase signal θ and voltage signal v to output drive signals DS which it supplies to the bases of the six transistors of inverter circuit 100, thereby causing the rotor 104 of brushless motor 102 to rotate at a speed corresponding to the speed command value ω*.

Thus, with this embodiment, the currents flowing in the U phase and V phase stator coils 103U and 103V are detected by current detection means 111, and these detected current signals Iu and Iv are used by power calculation circuit 112 to calculate powers W1 and W2. Control circuit 113 then obtains a voltage signal v and phase signal θ by PI control such that the difference of the powers W1 and W2 obtained as a result of this calculation is zero or a prescribed value. This voltage signal v and phase signal θ are then in turn used by inverter circuit 100 to control operation of the brushless motor 102. As a result, in contrast to the conventional arrangement using the terminal voltage of the stator coils, it is unnecessary to use a first order delay element constituted by a filter circuit. This results in good response to abrupt accelerations or decelerations and load fluctuations, and enables stability to be raised. Also, this embodiment has excellent response to external disturbances, detection is possible in the low speed region, and the range of control can be increased.

Figure 21:
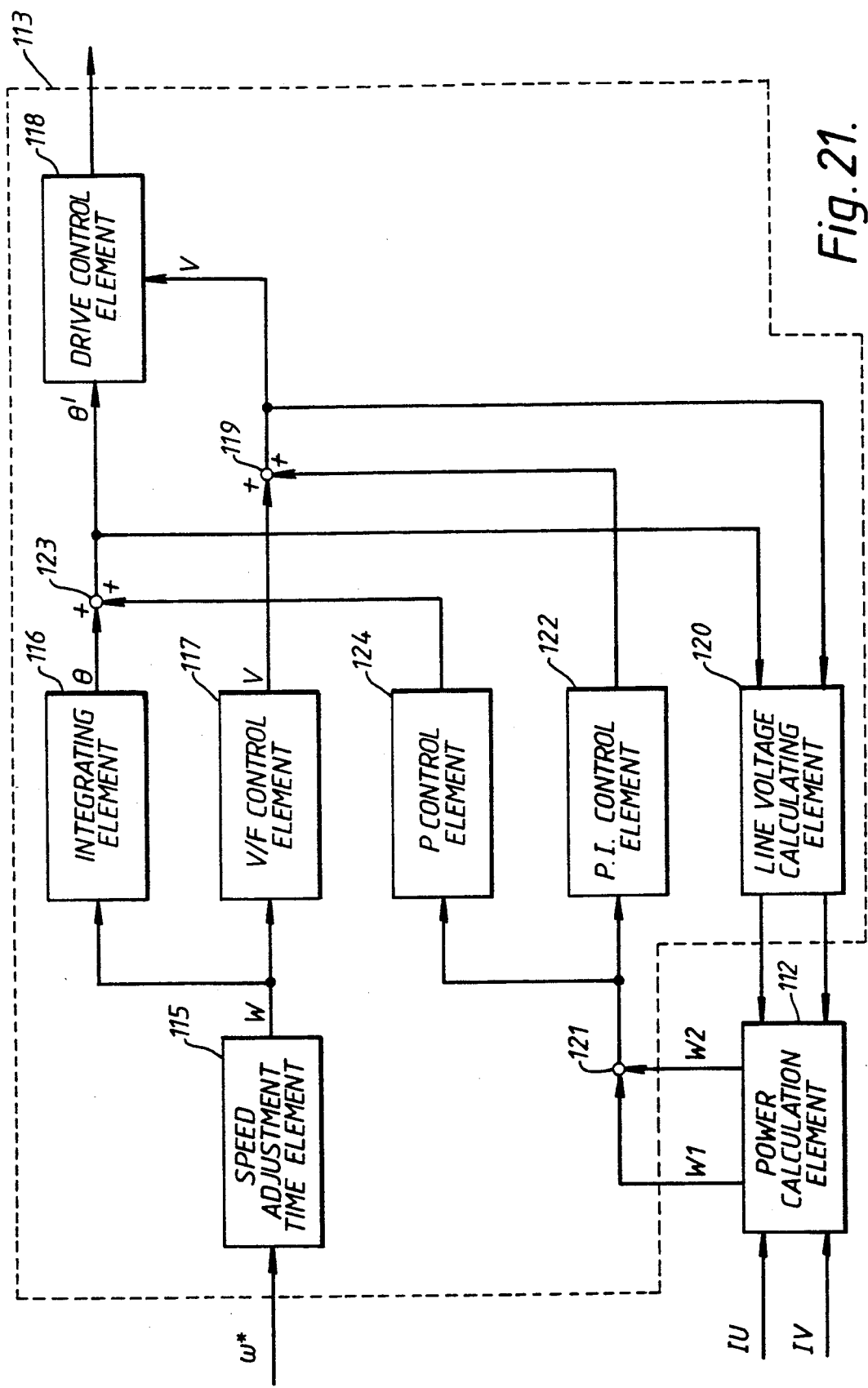
FIG. 21 is a block diagram showing an example layout of the control circuit shown in a ninth embodiment of the invention.
Figure 22:
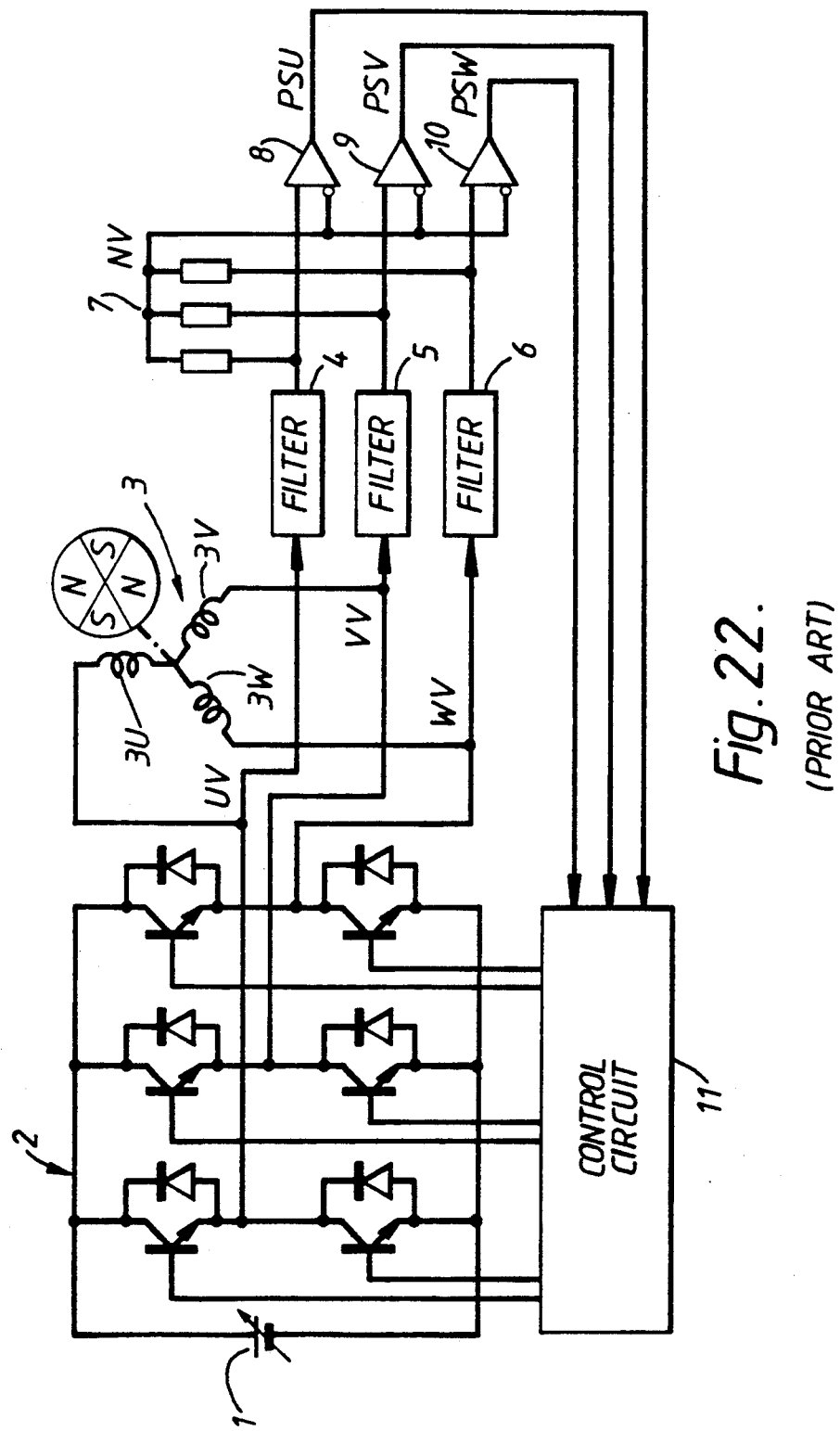
FIG. 22 is an electrical layout diagram showing a first prior art example.
Figure 23:
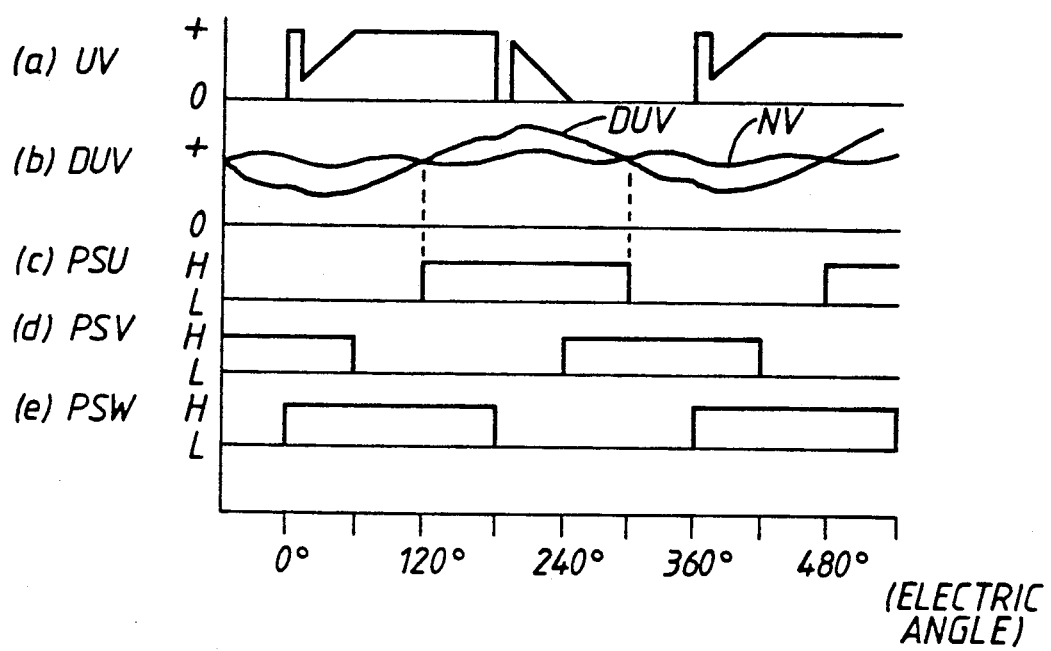
FIG. 23 is a signal waveform diagram of the various parts given by way of explanation of the operation showing the first prior art example of FIG. 22.
Figure 24:
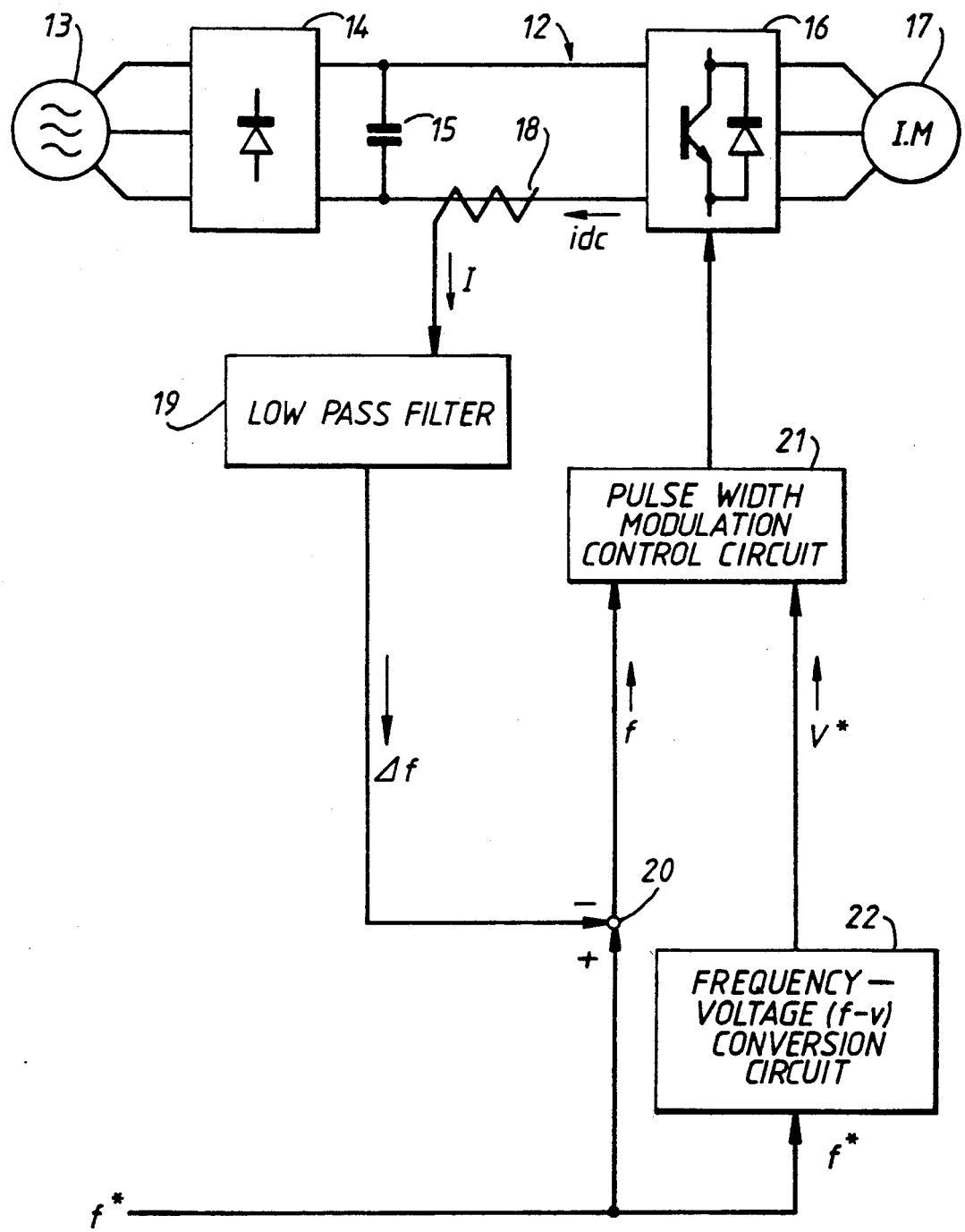
FIG. 24 is a block diagram showing a second prior art example.

FIG. 21 shows a ninth embodiment of this invention. Parts which are the same as in FIG. 20 are given the same reference numerals. The difference with respect to FIG. 20 lies in that control circuit 113 is additionally provided with an adder 123 and P control element (or it could be a PI control element) 124. A phase signal θ from integrating element 116 is applied to one of the positive (+) input terminals of adder 123, and difference signal from adder 121 is applied to the other positive (+) input terminal of adder 123 through P control element 124, so that a phase signal θ is output from the output terminal of adder 123.

With this ninth embodiment, even more stable feedback control can be performed.

It should be noted that, although in the above eighth and ninth embodiments the drive devices were depicted by blocks of respective functions, for example power calculating circuit 112 and control circuit 113 could alternatively be implemented in a microcomputer.

Although the invention has been described above with reference to preferred embodiments, this invention is not restricted to the embodiments described above and illustrated in the drawings. For example, it is not restricted to three-phase, but could be applied to A.C. motors such as multi-phase brushless motors or induction motors in general, and could of course, be put into practice in various modified ways within the scope of its essential nature.

What we claim is:

1. A control device for an AC motor, comprising:
 a source of DC power;
 inverter means for converting the DC power into AC power and supplying the AC power to the AC motor;
 current detection means for detecting a current flowing from said DC power source to the inverter means and for generating a signal representative of the detected current that is determined from both of a detected current Ia occurring at a first time at least before a changeover of phase of an output of the inverter means and a detected current Ib occurring at a second time at least after the changeover of phase of the output of the inverter means;
 power factor calculation means connected to the current detection means for calculating a power factor of the AC motor from the detected current and for outputting a corresponding power factor signal;
 voltage frequency calculating means for receiving as input signals at least the calculated power factor and a speed setting signal, for calculating control signals in accordance with the input signals, and for outputting the control signals; and control means for receiving the control signals and for generating drive signals to control the inverter means based on the control signals.

2. A control device for an AC motor according to claim 1, wherein said current detection means includes:
DC current detection means for detecting the current flowing in a DC side of said inverter means;
sampling and hold signal generating means for generating a sampling and hold signal from said control signals and said drive signals, wherein said drive signals invert at a prescribed electric angle determined by the output frequency of said inverter means; and
current sampling and hold means for sampling and holding the DC current signal from said DC current detection means under control of said sampling and hold signal.

3. A control device for an AC Motor according to claim 1, further comprising:
mean value calculation means for calculating a mean value of the signal from said current detection means; wherein said voltage frequency calculation means includes means for generating a voltage signal and frequency signal based on at least one of the power factor signal and the calculation result of said mean value calculation means.

4. A control device for an AC motor according to claim 1, wherein said power factor calculation means includes means for calculating the power factor of said AC motor from current values detected before and after the point of phase switching detected by said current detection means.

5. A control device for an AC motor, comprising:
inverter means provided with switching elements for converting DC voltage from a DC power source to AC voltage and for supplying the converted AC voltage to said AC motor;
current detection means for detecting a current supplied from the inverter means to the AC motor and for generating a signal representative of the detected current that is determined from both of a detected current Ia occurring at a first time at least before a changeover of phase of an output of the inverter means and a detected current Ib occurring at a second time at least after the changeover of phase of the output of the inverter means;
power calculation means for calculating a power passed to said AC motor from a command value and the detection signal of the current detection means; and
control means for generating control signals and supplying the signals to the power calculation means and for supplying drive signals based on the signals from the power calculation means to the inverter means.

6. A control device for an AC motor, comprising:
a source of DC power;
inverter means for converting said DC power into AC power and for supplying a converted AC voltage to the AC motor;
current detection means for detecting a current flowing from said DC power source to said inverter means and for generating a signal representative of the detected current flow that is determined from both of a detected current Ia occurring at a first time at least before a changeover of phase of an output of the inverter means and a detected current Ib occurring at a second time at least after the changeover of phase of the output of the inverter means;
power factor calculation means connected to the current detection means for calculating the power factor of the AC motor from the detected current and for outputting a corresponding power factor signal;
adder means for receiving the power factor signal and for adding to it a predetermined signal;
proportional integrating means for proportionally integrating the output of the adder means;
voltage frequency calculation means for receiving a predetermined reference signal and for generating a reference voltage signal; and
control means for receiving the output of the proportional integrating means, the reference voltage signal, and the predetermined reference signal and for outputting a control signal to control the inverter means.

* * * * *